(12) United States Patent
Rice

(10) Patent No.: US 7,837,595 B2
(45) Date of Patent: Nov. 23, 2010

(54) CONTROLLER FOR AN EXERCISE BICYCLE

(76) Inventor: Michael Joseph Patrick Rice, 9 St. Georges Hill, Bathampton, Bath (GB) BA2 6RN ( * ) Notice: Subject to any disclaimer, the term of this patent is extended or adjusted under 35 U.S.C. 154(b) by 0 days.

(21) Appl. No.: 12/507,373

(22) Filed: Jul. 22, 2009

(65) Prior Publication Data

US 2009/0286654 A1 Nov. 19, 2009

Related U.S. Application Data

(60) Continuation of application No. 11/889,302, filed on Aug. 10, 2007, which is a division of application No. 10/239,625, filed on Feb. 19, 2003, now abandoned, and a division of application No. PCT/GB01/01234, filed on Mar. 21, 2001, and application No. 11/889, 302, filed as application No. PCT/GB01/01234.

(30) Foreign Application Priority Data

Mar. 21, 2000 (GB) .................................. 0066672.0

(51) Int. Cl.
*A63B 71/00* (2006.01)
(52) U.S. Cl. ...................... 482/4; 482/1; 482/8; 482/57; 482/900; 434/61
(58) Field of Classification Search ................ 482/1–9, 482/51, 57–65, 900–902; 434/61, 247
See application file for complete search history.

(56) References Cited

U.S. PATENT DOCUMENTS

| 4,512,567 A | 4/1985 | Phillips |
| 4,542,897 A | 9/1985 | Melton et al. |
| 4,630,817 A | 12/1986 | Buckley |
| 4,637,605 A | 1/1987 | Ritchie |
| 4,709,917 A | 12/1987 | Yang |
| 4,711,447 A | 12/1987 | Mansfield |
| 4,713,007 A | 12/1987 | Alban |
| 4,887,966 A | 12/1989 | Gellerman |
| 4,976,435 A | 12/1990 | Shatford et al. |
| 4,998,725 A | 3/1991 | Watterson |
| 5,062,632 A | 11/1991 | Dalebout |
| 5,195,746 A | 3/1993 | Boyd et al. |
| 5,213,555 A | 5/1993 | Hood |
| 5,240,417 A | 8/1993 | Smithson et al. |
| 5,362,069 A | 11/1994 | Hall-Tipping |
| 5,433,690 A | 7/1995 | Gilman |

(Continued)

FOREIGN PATENT DOCUMENTS

DE      4 226 776      2/1994

(Continued)

*Primary Examiner*—Glenn Richman
(74) *Attorney, Agent, or Firm*—Buchanan Ingersoll & Rooney PC

(57) ABSTRACT

A controller is disclosed, especially but not exclusively, for use in combination with an exercise apparatus. The controller comprises in one arrangement a handlebar assembly and one or more input devices, of at least one of the input device being responsive to movement of the handlebars. The controller may include a support such as a handlebar stem, and may provide output signals to a microprocessor in turn to control operation of a programme running on the microprocessor.

20 Claims, 6 Drawing Sheets

U.S. PATENT DOCUMENTS

| | | |
|---|---|---|
| 5,466,200 A | 11/1995 | Ulrich |
| 5,489,249 A | 2/1996 | Brewer |
| 5,577,981 A | 11/1996 | Jarvik |
| 5,580,249 A | 12/1996 | Jacobsen et al. |
| 5,591,104 A | 1/1997 | Andrus et al. |
| 5,643,146 A | 7/1997 | Stark |
| 5,645,513 A | 7/1997 | Haydocy et al. |
| 5,648,708 A | 7/1997 | Littlejohn |
| 5,749,668 A | 5/1998 | McIlvain et al. |
| 5,839,990 A | 11/1998 | Virkkala |
| 5,888,172 A | 3/1999 | Andrus et al. |
| 5,890,995 A | 4/1999 | Bobick et al. |
| 5,947,868 A | 9/1999 | Dugan |
| 5,989,123 A | 11/1999 | Tosaki |
| 6,002,982 A | 12/1999 | Fry |
| 6,003,405 A | 12/1999 | Giard |
| 6,053,844 A | 4/2000 | Clem |
| 6,059,692 A | 5/2000 | Hickman |
| 6,126,571 A | 10/2000 | Parks |
| 6,132,314 A | 10/2000 | Aiki |
| 6,409,596 B1 | 6/2002 | Hayashida et al. |
| 6,530,842 B1 | 3/2003 | Wells et al. |
| 6,749,537 B1 | 6/2004 | Hickman |
| 6,918,860 B1 | 7/2005 | Nusbaum |

FOREIGN PATENT DOCUMENTS

| | | |
|---|---|---|
| DE | 29911700 | 9/1999 |
| EP | 0255142 | 2/1988 |
| EP | 0682544 | 5/1998 |
| GB | 2184817 | 7/1987 |
| JP | 1028086 | 1/1989 |
| JP | 10326073 | 12/1998 |
| WO | WO 87/00066 | 1/1987 |
| WO | WO 92/16267 | 10/1992 |
| WO | WO 96/36399 | 11/1996 |
| WO | WO 99/47215 | 9/1999 |

CONTROLLER FOR AN EXERCISE BICYCLE

The present application is a continuation application of U.S. patent application Ser. No. 11/889,302, filed Aug. 10, 2007, which is a divisional application of U.S. patent application Ser. No. 10/239,625, filed Sep. 23, 2002, which is a national stage application of PCT/GB01/01234, filed Mar. 21, 2001, and claims priority to GB 0006672.0, filed Mar. 21, 2000, the contents of each of which are incorporated herein by reference in their entireties.

This invention relates to an improved games controller for a microprocessor controlled unit. This invention especially but not exclusively relates to an improved games controller for a microprocessor controlled unit for use in the home or in a gymnasium. It in particular, but not exclusively relates to a controller (or input/output device) which in combination with an exercise device produces control signals indicative of a users, and the exercise devices, movements when exercising and supply these signals to a microprocessor based unit and to apparatus for use with an exercise cycle or an ordinary roadworthy bicycle or any exercise device.

Keeping fit and active is becoming an increasingly important part of people's lifestyles. Some of the best forms of exercise for keeping fit include cycling, running and rowing as they make the exerciser work aerobically. This both works the major muscle groups and also strengthens the heart and lungs. The result is an increased level of physical well being.

With increasing demands being placed on people's lives due to work and the family, it is often difficult to find the time to exercise regularly. Also, for much of the year in many countries it may be necessary to exercise in the dark outside of working hours. This can be unpleasant and dangerous.

Current medical reports state that the rapid rise in childhood obesity has been mirrored by an explosion of sedentary leisure pursuits for children such as computers, video games, and television watching. Reports also indicate that increased general activity and play rather than competitive sport and structured exercise seem to be more effective. Parents, however, tend to be content with their children staying in the home playing computer games rather than being worried about their safety if playing outdoors.

As well as the pressures of work and family for adults the above points are as applicable to adults as to children. The level of fitness in the general population in today's Western world is far removed from that of our ancestors. One of the best healthy habits is a regular exercise programme.

To meet the demand for increased exercise in an insecure, busy and often unscheduled lifestyle, a wide range of exercise apparatus has been developed. The most popular of these are the exercise bicycle, the treadmill and the rowing machine. These apparatus allow the user to perform the same range of movements as they would in the corresponding sport but in the warmth, safety and comfort of their home or gymnasium. In another arrangement, devices can be purchased that convert road bicycles into an exercise bicycle by arranging for the rear wheel to drive a load against a resisting force such as a turbine or magnetic brake whilst the bicycle is held stationary on a support.

For maximum benefit in the shortest space of time it is recommended that regular exercise consisting of twenty to thirty minutes at least three times very week is undertaken. As anyone who has regularly used an exercise bicycle or the like will know, these blocks of twenty minutes can be extremely tedious. Removing the interest provided by passing varied terrain in varied weather outdoors the act of cycling or rowing is quite repetitive and boring.

As a direct consequence of this monotonous exercise it is therefore often difficult to maintain the required degree of motivation needed to complete regular exercise using the devices. This is especially the case amongst the younger age groups where modern alternative pastimes such as computer gaming are now more popular.

In an effort to make the apparatus more interesting to use a variety of extra features are sometimes provided by the manufacturer as an integral part of the apparatus. In a simple case this may be a speed read-out which produces a number dependent upon the rate at which the user rows/pedals/runs and sometimes also on the resistive load provided by the machine. Although these do provide some initial interest the novelty soon wears off and the exerciser again looses interest.

In another alternative it is known to include a processor that varies the load in accordance with a preset programme to make the exercise more interesting. These are dedicated exercise devices to which the processor forms an integral part. They are both expensive and bulky. They are also inflexible, as with the exception of very expensive top of the range models they can not be programmed to alter the routines they provide.

An object of the present invention is to provide apparatus that not only relieves much of the monotony associated with the use of such devices but one which also improves exercise efficiency, providing for upper body exercise also. Further to provide a games controller with multi-axis controllability, mimicking the controls of a bicycle, to provide this to the user with realistic frames of reference.

According to a first aspect, the invention provides a controller for a microprocessor based unit, the controller comprising:

a handlebar assembly which can be held by a user and which includes one or more input devices adapted to generate input signals for supply to a microprocessor based unit, at least one of the input devices being responsive to movement of the handlebars by the user.

By providing a handlebar assembly which functions as a controller for a microprocessor based unit it is possible to arrange for the control of at least one parameter of a program operating on the unit by moving the handlebars. This allows a user to play a game on a bicycle to which the handlebars are attached at the same time as exercising on the bicycle. This will make use of the bicycle more attractive, particularly to younger users.

The handlebar assembly may be attached to or form a physical part of the piece of exercise apparatus on which the movements are to be performed. The support may therefore include a portion of handlebar stem adapted to be received within or supported relative to a headtube of a bicycle.

It will be appreciated that the controller and the exercise apparatus may be integrated as a single piece of equipment. However, the versatility provided by being able to attach a handlebar controller to any equipment will make the invention highly attractive in the leisure market.

The input devices may be removable from the handlebar and connected thereto by one or more cables or other means. This allows the devices to be positioned at various positions around a piece of exercise equipment.

The controller may further include a seat or saddle which can be sat upon by a user and which includes one or more additional input devices adapted to generate input signals for supply to the microprocessor based unit, at least one of the input devices being responsive to force applied to the saddle by the user.

In an alternative, the controller may include a saddle cover that includes the additional input devices and is adapted to be fitted onto an existing saddle. A further alternative providing a suspended, pivotable seat post device as per the handlebars.

It is most preferred that the input device comprises a set of handlebars for a bicycle or exercise bicycle. The input devices may be attached to or form an integral part of the handlebar assembly. Of course, if desired a user may operate the controller independently of a bicycle.

The handlebar assembly may comprise a set of handlebars attached to a handlebar support so that the handlebars can move relative to the support. The support may be adapted to permit the secure mounting of the handlebar assembly to a bicycle, an exercise bike, any exercise equipment or any supporting means (providing a table or lap top mount for game only use).

The controller may be attached to any supporting means, such as a table top mounting bracket. It is further retrospectively attachable to any piece of exercise equipment, from stationary exercise bicycles (including uprights, recumbent, manual resistance, automatic resistance, etc) to roadworthy bicycles modified to behave as stationary exercise bicycles (i.e. Trainers as referred to above) and to all other types of exercise equipment (e.g. Rowing machines, Stair Climbing Machines, Treadmills, Cross Country Ski machines, Elliptical Trainers, etc.). Prior art in this field are only attachable to either an exercise bike, a customised exercise bike or only to a Trainer, none can attach to both. This allows for greater economies of scale, making it cheaper for the customer.

For example, if fitting the device to a Trainer, the stem of my games controller simply replaces the stem of the real bicycle, a bracket on the stem of my games controller is supplied as a mounting to hold the real bars and controls in place while using the Trainer interactively and wires/other means connect from this main body to the remote input/output devices removably attached, by Bracket, Snap On, Velcro, Cable Tie or whatever means, to the Trainer. As a further example, if fitting my games controller to a stationary exercise bicycle, again the user need only remove the old bars and attach the system's bars to the bicycle via a bespoke/general adapter, which attaches to the existing bicycles handlebar support/stem and accepts the stem of my games controller. Again wires/other means connect this main body to the remote input/output devices removably attached to the bicycle.

At least one of the input devices may be adapted to produce an output signal responsive to the relative movement between the handlebar and the support. For example, the handlebars may be adapted to rotate relative to the support about at least one axis. This is preferably an axis in the plane of the handlebars so that the user may rotate the handlebars to simulate turning a corner. This may be a vertical axis located at substantially the centre of the support when in use.

The handlebars may further be adapted to move up and down (forward and backward) relative to the support in a plane substantially orthogonal to that for left/right rotation. An input device may be provided which produces an output indicative of the up/down movement of the bars. In use this may be a substantially vertical axis. The user may therefore push/pull the bars away from/towards him to simulate the shifting of weight on the bars.

Furthermore, the handlebars may be adapted to rotate about a third axis that is perpendicular to the first two axes. This allows the user to move the bars to simulate the leaning of a bicycle or other exercise device. The assembly may therefore be adapted to rotate about an axis in the plane of the handlebars so that the user may rotate the handlebars to simulate turning a corner. This may be a vertical axis located at substantially the centre of the support when in use. In the following description the x, y and z axes are from the perspective of looking into the z-axis with the handlebars if front of you, x-horizontal and y-vertical.

Furthermore, the handlebars may be adapted to move linearly along fourth and fifth axes. This allows the user to move the bars to simulate the lifting up or pushing down the front wheel or sidestepping of a bicycle or other exercise device. All are described further below.

Turn Left/Right (Steer) Devices—Control about Y-Axis,

Specifically, the handlebars provide for such left/right turning (substantially about the y-axis). An input device may be provided producing a signal indicative of the left/right movement of the bars, simulating steering in a cycle. Specifically, this provides for realistic control of any object in a 3D world-ROTATIONALLY ABOUT Y AXIS.

Weight Forward/Backward (Pitch) Devices—Control about X-Axis,

The handlebars may further be adapted to lean forward and backward relative to the support (substantially about the x-axis). A further input device may be provided which produces an output indicative of the forward/backward movement of the bars. The user may therefore push/pull the bars away from/towards him to simulate the shifting of weight on the bars, i.e. over the front or rear of the bicycle. Simulating front and back wheel weight distribution in a cycling simulation.

Specifically, this provides for realistic control of any object in a 3D world—ROTATIONALLY ABOUT X AXIS.

Weight Left/Right (Bank) Devices—Control about Z-Axis,

Furthermore, the handlebars may be adapted to rotate about a third axis that is perpendicular to the first two axes, that is leaning the bars to the left or right (substantially about the z-axis). This allows the user to move the bars to simulate the leaning of a bicycle or other exercise device. A further input device may be provided accordingly. Specifically, this provides for realistic control of any object in a 3D world—ROTATIONALLY ABOUT Z AXIS.

Lift Up/Push Down Devices—Control Along the Y-Axis,

The handlebars may be may further be adapted to move up and down relative to the support in a plane substantially orthogonal to that for left/right rotation, that is lifting up or squeezing down the bars (substantially along the y-axis). In use this may be a substantially vertical axis. A further input device may be provided accordingly. Specifically, this provides for realistic control of any object in a 3D world—LINEARILY ALONG Y AXIS. This simulates lifting or pushing down the front wheel on a cycle and can be used to control simulated jumping and ducking on the ground.

Sidestep Left/Right Devices—Control Along the X-Axis,

Furthermore, the handlebars may be adapted to move to the left and right relative to the support in a plane substantially orthogonal to that for left/right rotation, that is sliding the bars out to the left or right (substantially along the x-axis). In use this may be a substantially horizontal axis. A further input device may be provided accordingly. Specifically, this provides for realistic control of any object in a 3D world—LINEARILY ALONG THE X AXIS. This simulates the "Sidestep" control that may be performed whereby a cyclist may move the bike under them in a sideways manner, generally only done in the air or when jumping on the spot.

Twist Grips

Another proposed input device comprises a rotatable grip portion of the handlebars that may be twisted forwards and/or backwards by a user, the device producing an output signal indicative of the amount by which the grips are twisted.

This provides increased Game Only application being able to be twisted be a user in a forward or backward manner (backward as per a throttle control on a motorcycle, my controller providing for forward rotation too). The device producing an output signal indicative of the amount by which the grips are twisted. Only one may be provided or two may be provided in alternative embodiments. Specifically, this provides for realistic control of any object in a 3D world—LINEARILY ALONG Z AXIS (if provided in duplicate the left one may replace or augment the lift/drop function of the bars, for example). In use for interactive exercise, this device may be used to represent changing gear on a bicycle or it may incorporate the manual resistance adjustment and sensory means. Z-axis control is then through pedaling/braking.

Seat—On/Off and Weight Input Devices

Further, the seat may provide input devices being responsive to force applied to the saddle by the user. This may be provided in the form of a seat cover or replacement seat which may provide signals representative of the user being sat thereon, and/or of the users weight on the seat.

Rear Sidestep/Yaw Left/Right Devices—Control Along X-Axis, or about Y-Axis,

The seat cover or seat may provide further input devices responsive to the user exerting force against them along a substantially horizontal axis. This provides for such left/right control inputs (substantially along the x-axis or about the y-axis). An input device may be provided producing a signal indicative of the left/right force against the seat. Further, a seat post may be provided that is adapted to move horizontally relative to the support (substantially along the x-axis or about the y-axis). A further input device may be provided which produces an output indicative of the left or right movement of the seat. Specifically, this provides for further or alternative realistic control of any object in a 3D world—ROTATIONALLY ABOUT Y AXIS or LINEARLY ALONG X AXIS. It may be in place of the handlebar slide left/right function or augmenting it. In a bicycle simulation this provides for the "bum-steering" method of cycle control, for rotational control while "in the air" and provides for simulation of real world freestyle techniques.

Rear Weight/Lift Up/Push Down Devices—Control Along Y-Axis, or about X-Axis,

Further, a seat post may be provided that is adapted to move vertically relative to the support (substantially along the y-axis or about the x-axis). A further input device may be provided which produces an output indicative of the upward or downward movement of the seat. The user may therefore push down or lift up the seat, i.e. the rear of the bicycle. Simulating the user putting more weight through the seat, for instance when climbing on slippery surfaces, or lifting the rear of the cycle in a jump. This may also incorporate the seat on/off and weight functions. Specifically, this provides for further or alternative realistic control of any object in a 3D world—ROTATIONALLY ABOUT X AXIS or LINEARLY ALONG Y AXIS.

This provides ten degrees of freedom about the handlebars, two about the pedals/brakes (or the forward/reverse twist grip), and further four about the seat. This enables full, three dimensional/rotational simulation and control through familiar and realistic frames of reference to the user.

The preferred embodiment provides for all the real world controllability of any moving object. This opens the controllable nature of the product to being able to control any object through any world. This can be used to therefore control cars, motor-bicycles, planes, submarines, robots etc., and spacecraft too. For example, if controlling a simulated person/robot in the first person, the user could control Turn L/R, Jump or Up/Duck or Drop, Look Up/Down, Side Step L/R, Look L/R and Walk Forward/Backward, respectively as per the above list.

The handlebar, and seat, brakes and twist grip, assembly may include a resistance means which provides a resistance to movement of the handlebars relative to the support about any of the available degrees of freedom. This may comprise one or more springs such as compression springs. One or more dampers or twist resistance mechanisms may also be provided to damp any movement. By providing resistance it becomes necessary for the user to apply a load to overcome the resistance. This resistance may be preset or adjustable over a range of values. This feature allows movement of the users weight to be detected when used in combination with an exercise cycle as well as providing a work-out for the upper body, providing strength and flexibility training.

The resistance and damping may be adjustable by the user. This allows the resistance or damping to be reduced to make movement easier if required, or increased.

Alternatively, the resistance and damping means may be adjusted automatically in response to signals generated by either microprocessor unit. This adjustment may, for example, be responsive to the terrain over which a bicycle is passing on a screen attached to the processor and/or the speed of a simulated bicycle reproduced by the microprocessor on the screen or in a strength training programme.

The resistance and damping means may be associated with movement of the bars relative to the support about one of its axes of freedom. It is, however, preferred that a resistance is provided against each degree of freedom.

The preferred embodiment of the controller may provide resistance and damping means about all degrees of freedom of the handlebar, and seat, devices. The movements of these devices are set up and arranged so at to require the user to make realistic movements and to require them to exert significant force, against these resistance, springing and damping means, to move them and hold them in place.

The movements of the handlebars and seat may be about pivoting, extending, compressing and sliding mechanisms. Stems within this design may be movable to adjust for different sizes of user and may provide further adjustability to the resistance means.

Movements are generally against stiff progressively sprung, return to zero hinging mechanisms optionally with progressive twist dampers. An alternative to the return to zero set up is in that one or more of the handlebar control input devices may not be of the return to zero nature but includes substantial, adjustable resistance to movements without a return to zero function. The return to zero function may be disconnectable and may be automatically controllable by either microprocessor. This will negate the need for the user to exert force against the resistance to simply hold the control in place when moved away from the central position. Sensors return the appropriate signal for that position.

Also the handlebar control input devices may not be of the return to zero nature but may be "spinnable" through 360 degrees. This function may be automatically controllable by either microprocessor and may further be without the resistance. The resistance, in the automatically controlled embodiment, may be controlled so as to provide little or no resistance when the simulated bike is in the air.

The handlebar assembly may further include one or more levers which can be operated by a user. Two such levers may be provided, one towards each end of the handlebars. Each lever may be adapted to produce a respective input signal dependent upon the position of the lever, i.e. its movement when pulled by the user.

The levers can be used to simulate the brakes of a bicycle. They may comprise an actual brake lever attached to a suitable switch to produce the input signal, or may be custom made and include an integral switch.

The output from each lever may comprise a stepped output over at least part of the range of movement of the lever. Therefore, the input signal produced may be constant and of a first value over a first range of movement and constant or variable but of a second, different, value over a second, different, range of movement.

These "brake" levers may further incorporate a dual stage, stepped as well as progressive and analogue, resistance to movement and outputs there-from. This simulates the real feel and control of brake application. The first resistance stage may be very low and only slightly progressive over an initial range to simulate the slack/free play between the brake pad and the wheel rim. Further application will be against the second stage of resistance/damping against stiff progressively sprung, return to zero hinging mechanisms optionally with progressive twist dampers. The sensor may send no signal over this first range, as the brakes are not applied yet. When the second stage is encountered, the lever moves the integral or connected joystick device from zero through its full range therefore providing an analogue signal representative of the brake pressure being applied by the user.

Further input devices may comprise one or more of seat, pedal, floor and hand-grip pressure sensors, sensing the users physical movements, i.e. if they are seated/standing, pushing and pulling the pedals, with their foot down or with no hands. These are more thoroughly discussed in accordance with the second aspect.

The handlebar assembly further provides a plurality of Game and System Input Devices, specifically providing such game control as is standard on any games controller which, when activated by the user instruct the microprocessor to perform a certain function. These are more thoroughly discussed in accordance with the second aspect.

Of course, the controller may include means for locking the handlebar, or seat or brakes, assembly in place against movement about one of its degrees of freedom. This prevents movement about their degrees of freedom to cater for those users maybe using the inbuilt microprocessor-based unit to use the equipment purely as a computer controlled piece of equipment and for those users who may want the full graphics and sound capabilities but are not interested in the fun/technical control side of the system, this may be especially important to parents, older users, etc who may select for the software to control the direction, etc, i.e. "Autopilot" of the, e.g., simulated cyclist while they provide the power thereto. None of the prior art has this functionality. This may permit folding and locking to enhance portability.

The controller may further include one or more output devices which may comprise actuators that are adapted to cause movement of the handlebar assembly in response to signals from the input devices or signals supplied from a microprocessor based unit. This may be a movement about any one of the axes of freedom of the handlebars relative to their support. The controller may further include one or more actuators which are adapted to cause movement of a saddle, or exercise device, in response to signals from the input devices or signals supplied from the microprocessor based unit.

Providing at least one actuator to cause movement of the controller enables an increased level of realism to be provided. For example, the actuator may be adapted to cause a portion of the controller to vibrate to simulate travelling over rough terrain. The magnitude of the movement produced may be varied, as well as its frequency.

At least one of the actuators may comprise an electromagnet which when energised is adapted to strike a portion of the handlebar assembly or the saddle/seat assembly. This may generate a knock or thumping sensation for a user holding the handlebars.

An actuator may be supported in such a way as to move either a support for a handlebar, or seat or exercise device, portion of the controller or to directly move the handlebar, or seat or exercise device, portion. It may be located at least partially or wholly within the handlebar, or seat or exercise device, portion of the support.

These are actuators, vibrators and thumper units, removably attachable to the equipment and/or integral to the equipment, controller body, handlebar and seat that are controlled by the microprocessor unit(s).

These units move the equipment, vibrate it and thump it to emulate the real world feelings of falls, knocks, skids, brake judder, rapids, different surfaces, etc. This gives the user more information to process than simply the simulated track in front of them, it drives the mental side of the equipment more and engages the user's mind more in the "game" than the exercise. A plurality of such devices are provided attaching to the handlebars, seat or exercise device providing general shocks or shocks specifically for braking, surface, tyre feel and damage tactile sensations.

Further of these such outputs are used to control the resistances provided by the exercise device, such as pedal resistance or incline, and also the automatically controllable resistances within the handlebar, seat, brake and twist grip devices and a variable speed fan as referred to below.

The handlebar assembly may include an output connector which allows the assembly to connect to a microprocessor based unit for passage of the output signals to the unit. The output connector may facilitate a hard wired connection to the microprocessor based unit. Alternatively, it may include an infra-red communication port for wireless communication, or perhaps communication based on radio-waves.

The handlebar assembly may include a means for disabling the connection to the microprocessor based unit. This may, for instance, be used to stop unauthorised use of the assembly. It may be key or electronically operated.

The input devices may comprise sensors or switches that produce either an analogue or a digital output. The output may be continuous or pulsed. It will, of course be readily appreciated that the choice of format for the signals produced by the devices will depend to a large extent on the requirements of the microprocessor that it is to be connected to. The input devices may be touch sensitive.

It is most preferred that the controller assembly is adapted to produce output signals that may be passed to a games console such as a Sony Playstation through a connector that is plugged into the controller port of the console. Ordinarily, the consoles receive signals from simple joysticks or control pads. These pads may be replaced by the controller of the present invention. This is a considerable advantage. Most people already have a basic exercise device such as an exercise bike. They will also have a suitable microprocessor based unit. The provision of such a handlebar assembly in combination with an ordinary exercise bicycle will be considerably cheaper for most people than having to buy a dedicated computer controlled exercise apparatus.

The handlebar assembly may include a wiring loom which includes at least one connector to which one or more additional input devices may be attached. This allows the controller to receive signals from additional devices, such as the floor "foot down" sensors above.

The controller specifically provides an array of connectors to which additional input or output devices may be connected to. The additional input devices that may be attached to the controller through the input port or which may form an integral part of the handlebar assembly are as follows:

The controller may further include one or both of a speed sensor and a cadence sensor responsive to the rate of revolution of pedals or the speed of a bicycle, or its flywheel. The cadence sensor (or speed sensor) may produce an output signal that varies in proportion to the cadence. This may be a pulsed output in which the spacing between the pulses varies with cadence, or an analogue output voltage, generally then converted to an appropriate resistance, that increases or decreases as cadence changes. A plurality of each may be provided and they may be provided to enable detection of direction of rotation.

In an alternative, the speed sensor and/or cadence sensor may produce a first output if the cadence is below a certain threshold level and a second output if it exceeds the threshold. This threshold may be varied under the control of the microprocessor based unit running a suitable program, as discussed further later.

Providing a controller in the form of handlebars and a speed and/or cadence sensor enables a user to attach the device to his/her bicycle and control a programme running on the microprocessor-based unit whilst exercising. In addition to being able to control a programme run on the microprocessor by moving the handlebars it is then also possible to control the programme by varying the rate at which the pedals are rotated.

Where the handlebar assembly is used in combination with an exercise bicycle that has more than one gear (or resistance level), the input devices may include a gear (or resistance level) selection sensor adapted to produce a signal indicative of the gear ratio (or resistance level) of the bicycle which is selected by the user. In the pure gaming embodiment this may simply be a gaming input device indicating the users selected gear. This may be included within the twist grips.

An input device may be provided which is adapted to produce control signals which are indicative of the resistance setting of the pedals or flywheel or generator, etc (how much power is needed to pedal at a given cadence). This may include further devices as required, e.g. to sense incline setting or, on the manually adjustable handlebar systems, sensing the resistance settings in the handlebar, etc devices. This may be used in conjunction with a sensor adapted to measure the torque produced in the pedals assembly in order to enable a measurement of the energy expended by the user to be made. The torque sensor may comprise one or more strain gauges that are adapted to measure deformation of at least one pedal crank.

In an additional or alternative arrangement the handlebar assembly may include a gear (or resistance level) selection actuator that can be attached or otherwise connected to the gear (or resistance level) selector of the bicycle and is adapted to receive signals from the microprocessor based unit in turn to change the gear (or resistance level) setting of the bicycle. This actuator may, for obvious reasons, be located remotely from the handlebars and be connected thereto by one or more electrical cables.

My games controller may control the existing resistance mechanism (via a direct output line from the microprocessor-based unit, by integration, electrical or mechanical connection or whatever means). Such devices may be supplied in plurality to enable control of all parameters of the exercise device, for example controlling resistance, or speed, as well as, for example, incline on a treadmill.

In a further alternative, pedal pressure sensors may be provided that measure the pressures applied to one or both of the pedals of an exercise cycle by a user. This device may produce an output signal that varies with downward pressure applied to the pedals. It may also produce an output signal that varies with upwards pulling force on the pedals when the pedals allow the users foot to be securely held in place, for example by toe-clips. These outputs may also therefore inform the microprocessor as to whether the users feet are on the pedals or not. These output signals can help to improve the users pedaling technique when it drives a suitable output from a microprocessor based unit to give feedback to a user.

Alternatively, or additionally an input device may be provided that produces a signal or signals indicative of the weight of the user on the saddle (whether they are stood up or sat down). It may also produce a signal indicative of the weight of the user.

An input device may also be (or alternatively be) responsive to the user's heart rate or pulse. This may comprise an ear clip type sensor or a chest belt type sensor assembly or a hand-grip style sensor.

One or more of the input devices may be secured to the handlebar or exercise device assembly by screws or bolts or may be permanently fixed in place with glue or brazing. Alternatively, they may be detachably attached by either a snap-on type connection or a hook and loop fastener, such as that sold under the mark Velcro.

The handlebar or seat assembly may be attached to or form a physical part of the piece of exercise apparatus on which the movements are to be performed. The support may therefore include a portion of handlebar or seat stem adapted to be received within or supported relative to a headtube or seat tube of a bicycle or an exercise cycle.

The handlebar assembly may include a quick-release mechanism that allows it to be quickly and easily removed from an exercise apparatus.

Of course, it will be appreciated that the controller and the exercise apparatus may be integrated as a single piece of equipment. However, the versatility provided by being able to attach a handlebar controller to any equipment will make the invention highly attractive within the leisure market.

The handlebar assembly may include an area of electronic memory adapted to store information indicative of a users physiological ability and/or exercise preferences e.g. Age, sex, height, weight, blood pressure, heart rate, activity level. This may include information about the users power output when pedaling, preferred resistance against pedaling loads etc. This may also include information about the exercise device, the users embodiment and configuration or control data. The memory may also store information which can be used by a programme to construct a training programme appropriate to the user of the handlebar assembly. This may include performance data obtained by the handlebar assembly from a previous exercise session. The handlebar assembly may include appropriate wiring for access of the information form and for writing information to the area of memory. This memory may be integral or by attachable means.

The controller may further include a display and speakers which are mounted onto the handlebar assembly and which is adapted to display/sound information dependent upon the signals produced by the input devices or from either microprocessor. The display may show gear selection information or heart rate for example, or perhaps speed, cadence, time, distance. It may also display a training map in the form of a histogram or other graphical representation of the users exercise program. The speakers may warn of changes to occur or encourage the user or may provide for communications.

The controller may include a microprocessor and thus form a complete integrated system. No other external microprocessor based unit will then be required and signals from the input devices may be passed to this integral microprocessor. Further functions of this are discussed further in accordance with Game Free and Any Game modes later. This may provide the De/Coder function, internal signal copying, mapping and otherwise controlling functions, threshold functions and shock and/or resistance controlling functions as referred to throughout. This is key to the multi modal operability of the system as referred to in accordance with the third aspect. Internal and/or external power means are also provided.

One of the main features and benefits of my games controller is that it can be used in a variety of ways. It can be purely used as a state of the art games controller (Game Only), as per the first aspect overall. It may be used to run bespoke exercise or simulation software (Bespoke Exercise/Gaming) or it can be used to play any other games (Any Game & Train), whereby the users exertions may be combined to power the accelerator or fire commands of that game. It is the input/output structure of my games controller, along with the internal microprocessor-based unit for additional features, which makes these options possible. These are discussed further in accordance with the third aspect.

The game only functionality of my games controller is provided by my controller being a I/O controller in its most basic form, as described fully earlier. As childhood obesity is such a problem, this mode provides a unique opportunity for parents to demonstrate and for children to get used to and enjoy the system so that it may encourage full use with exercise. It also provides for better value for money due to this multi functionality. In this mode the system is a pure games controller that has the benefit of real input mechanisms, like the steering wheel type controllers available for most platforms, and a stable base, unlike most games controllers. This also provides for exercise free training at the technical side of the cycle game. In the embodiment disclosed in the drawings, the EXTRA analogue/digital or touch sensitive button may be readily used for game only mode. This would, for example, take the cadence or speed circuit, or whatever circuit it is configured to, and gives this circuit full manual control through this button which would commonly be or be set up to be the accelerator/fire/etc. button, without needing the user to exercise.

The above devices in combination and their links to all the input and output devices in my games controller can control the input/output mapping/setting of the devices within the system, with reference to their control lines into or out of the external microprocessor-based unit and or their outputs' control. This can be individually or with reference to a plurality of signals from any one or more inputs, maybe according to comparison against target input levels, frequencies, rates, statuses, etc.

The controller may further include a video camera which is adapted to take pictures of the user and transmit the images to the microprocessor based unit. The camera may comprise a CCD device and may be mounted onto either the handlebar or the support.

The provision of the camera may be used to transmit images of the user from one microprocessor based unit to another, for example over the internet. These pictures may then be displayed on a screen so that users can see other users. It is envisaged that this will be especially useful in allowing users to compete against each other using interlinked microprocessor based units whilst seeing the images of the other user.

The controller may include a microphone and one or more voice-responsive inputs. These inputs may be adapted to produce input signals to the microprocessor based unit which are dependent upon commands spoken by a user. The microphone may be used for communications, voice sampling, etc. as per the camera.

The controller may further provide a keyboard and or a pointer (mouse, trackball, pads, etc).

It is further envisaged that my controller may have audio and visual input devices, receiving signals from an external CD player, TV arial, Video, or whatever. It may also provide Graphical and Audio Overlay output devices whereby it can overlay graphical and audible signals over that on the users TV, etc. The integral microprocessor may accordingly provide audio/visual overlay features whereby it can overlay the input signal on its display and/or speakers or to the external display/speakers.

Finally, providing an integral modem and/or connection to standard line, may enable use of the system in Game Free mode over the internet or networked in this way.

The above devices may be communicated through the controllers output connector through the same lines or through additional wiring with multiple connectors at the end connecting, for example, to the game controller, microphone, a USB, keyboard and mouse inputs on a PC. A "Double Adaptor" may then be provided at each of these to enable the standard devices for that computer to be used as normal. A manual or automatic switch may be provided which controls which devices may be used, ie the normal device or remote one proximal to the exercise unit.

According to a second aspect, the invention provides an exercise apparatus comprising:

a programmable microprocessor-based unit including a receiving means adapted to receive signals from a programmable cartridge or other programme storage device that provides programme instructions for controlling the operation of the programmable microprocessor-based unit;

output means through which output signals can be passed from the microprocessor to a display;

a display (optionally including speakers) adapted to display images dependent upon the signals from the microprocessor-based unit;

an exercise apparatus adapted to allow a user to perform a range of movements associated with a sport; and a controller according to the first aspect of the invention comprising one or more input devices adapted to supply signals to the microprocessor-based unit to modify the operation of the programme running on the microprocessor in turn to modify the images displayed on the display;

in which at least one of the input devices is responsive to the movements of the user on the exercise apparatus.

It is most preferred that the exercise apparatus comprises an exercise bicycle or a road bicycle which is modified to behave as a stationary exercise bicycle.

The programmable microprocessor-based unit preferably comprises a games console. The microprocessor-based unit may comprise a unit sold under the name "Sony Playstation" by Sony Corporation, or one of the other games/consoles sold by Nintendo. These consoles include the required processor and an input for a game controller. The input/output device of the present invention may replace or supplement such a game controller and connect to the unit through the input post provided. The unit may alternatively comprise a personal computer, in which case the controller may interface to the computer through the common game controller interface, USB interface or as an alternative to or in addition to the use of a keyboard.

The applicant appreciates that a system which combines an exercise apparatus and a games console will appeal to a wide audience. Both of these devices are present in many households already. By providing appropriate program for the console and a suitable low-cost controller to attach to the exercise device and novel and useful exercise apparatus can be provided.

Connecting the controller to a games console or personal computer enables users to cost effectively train with and, or, against other users in simulated races or group outings across multi linked consoles, local area networks, wide area networks and the internet. It enables cost effective interactive multi player races, games, tours, events, etc; bulletin board races can be entered allowing users to meet and train with real people; users may find groups of on line friends with similar abilities or objectives to train with; on line Olympics can be held, which may require the racers to be racing from a controlled complex where all machines are standardised; users can go to the virtual bike park to train technically or at freestyle; users can train with their friends or training buddies while at home or at the gym or even when on holiday or travelling on business.

The programme cartridge or other device (such as a magnetic or optical disk) may contain programme instructions which when run on the microprocessor-based unit provides images and sounds on the display and speakers corresponding to a simulation of the exercise undertaken. The display may be head mounted.

As an example, the display may show a view along a stretch of road or mountain track, the rate at which the user moves along the road will vary with the speed at which he/she pedals and perhaps the gear in which the bicycle is set. The display may show a right turn when the user pulls to the right on the handlebars of the cycle, and a left turn when they pull to the left.

The programme may simulate a race, such as a rowing race or bicycle race. The user may interact with the programme through the input device and either win or lose the race depending on the input from the input device. This may include speed but may also depend on technique (i.e. timing of movements by the user where such signals are generated by the input device). Where two or more microprocessor based units are interconnected, each unit may run similar or identical programmes and the display associated with each device may indicate whether the user is ahead of or behind the user of the other unit. This allows a head to head race to be simulated.

The programme may be adapted to perform an initial grading and classification of the fitness level of the user. This will then be used to set customised, realistic, goals and milestones in the form of game levels, updating this fitness level in real time.

The microprocessor-based unit (external or integral) may be further adapted to produce an output signal to an actuator or more than one actuator to control movement or other parameters of the exercise device responsive to the programme running on the unit. The present invention provides for such control without requiring any modification of the external microprocessor, using the feedback outputs.

For example, the output signal may be adapted to instruct the exercise device to increase resistance to the user performing a particular movement. In the case of an exercise bicycle, this may be to make it harder to pedal or easier to pedal depending on the programme that is running. In a treadmill this may increase resistance and incline.

Alternatively or additionally, the output signal may operate an actuator which vibrates, thumps or knocks at least a part of the exercise cycle or other exercise device, for instance to simulate rough terrain or other obstacles. The display may, for instance, show that a simulated "bicycle" route includes rough terrain and move the actuators to simulate the feel of such rough terrain.

The microprocessor-based unit may include memory means adapted to store user definable parameters. Alternatively, it may be adapted to communicate with a remote memory (such as a memory card or module) and to store/retrieve information from the memory. A further memory may be provided which is adapted to communicate with the microprocessor based unit through a port provided as part of the handlebar assembly. This may be integral or connected to this unit.

The memory may store information indicative of a user's physical abilities such as strength or stamina. The memory may store settings for the exercise device which can be used by the programme running on the microprocessor-based unit. This may also store information regarding the game and the users preferences/configurations.

The input signals produced by the input devices of the controller and the output signals received by the controller the may be categorised into one or more of five categories:

1. Active input devices.

2. Control input devices.

3. Gaming input devices.

4. Simulation devices.

5. System devices.

Examples of each class of input are as follows

Active Input Devices

These are input devices that are adapted to supply signals to the microprocessor in order to control the physical training side of the apparatus. They provide the interface for the important physical factors which convert the users actual physiological efforts into an input signal to be processed by the microprocessor-based unit.

These active inputs may be one or more physical and physiological exercise input devices that read and measure the activity levels of the user and of the equipment, as powered by the user, and send signals to the microprocessor-based unit(s) representative thereof. These input devices control the physical exercise side of the system as they convert the physical and physiological efforts of the user on the equipment into activity and exercise based input signals for the microprocessor-based unit(s). They measure the activity levels of the key mechanical and physiological activities, exertion levels of the user, rates of repetition of activities on the equipment and the resistance and/or gear selected. They enable measurement of activity and incentivise the user to increase activity or to maintain activity levels within programmed variable boundaries. They provide for the actual simulation of the users actual efforts and outputs through live or threshold to the microprocessor(s).

They may provide analogue or digital signals as sensed by whatever sensory means, remote or integral to the equipment or controller main body, communicated by whatever communication means, feeding directly or indirectly to the external and integral microprocessor-based units via the integral and industry standard electronics and may be integrated with the equipment or removably attached by whatever means.

It is envisaged that one or more of active input devices may be provided to measure various parameters. The preferred embodiment of my games controller provides for Speed, Cadence, Resistance Selected, Gear Selected, Torque Applied, Seat On/Off, Weight and Heart Rate monitor active input devices, although further devices may be added.

Speed & Cadence Sensory Means

A first input device may be provided which is adapted to produce a signal indicative of the rate of repetition of a movement performed by the user. This may for instance be the rate at which the user rotates the wheel of an exercise bicycle, or the number of strokes per minute of the oars of a rowing machine. It may comprise a switching device comprising a magnetic sensing means such as a reed switch and magnet whereby a signal is produced whenever the magnet passes the magnetic sensing means. A magnet may be attached to a flywheel or roadwheel of a bicycle and a reed switch attached within proximity to flywheel fork leg of exercise bike—measures each revolution of the wheel to gauge user's efforts. Alternatively, or additionally, the magnet may be attached to the pedal crank of an exercise cycle and the reed switch attached within proximity to pedal crank arm. This would measure each revolution of the crank to measure cadence.

The Speed Input measures the rate of rotation of the equipments wheel, flywheel, rolling road, fan etc. The cadence input measures the rate of rotation of the equipments crank, oars, user's legs etc. The cadence therefore measures the rate of exercising input to the mechanism and the speed measures the rate of output/simulated movement through the equipment's resisted mechanism, i.e., the outputs of their efforts. They communicate signals representative thereof to the microprocessor(s). A plurality of each may be provided and they may be provided to enable detection of direction of rotation.

They function, work, communicate and may be provided in the same ways and means as described above for all devices. Again they can be by whatever sensory, output and communication means and can be integral, snap on, attachable, or connectable. They could be, for example, measured by a magnet and reed switch connected to/proximate to the flywheel and cranks of a stationary exercise bicycle or by photoelectric means, or may be simply connected to the equipment's existing measurement means from the flywheel, crank, motor, generator, etc. The cadence sensor(s) could be integrated under the rolling surface of a treadmill and speed sensor(s) connected to the speed sensor mechanism.

These inputs provide a direct input to the microprocessor-based unit(s) of the physical and mechanical input and output of the user. Prior art only disclose one device in this regard, generally cadence. The benefit of both input devices, therefore measuring exercise inputs and outputs, is especially relevant in the connectability of the system to Trainers and Geared Exercise bicycles, the reality of simulation and technical training.

Both devices also provide for better momentum control of the simulation, providing a real, live input to the microprocessor-based unit(s) as per that experienced by the user. The inputs, and therefore simulated outputs, will therefore appear real to the user with regard to their actual power inputs and feel of momentum. For example, the flywheel on the equipment slows down, when pedaling ceases, in accordance with the resistance setting on the equipment, which is set as appropriate to the simulated environment. As pedaling has stopped, forward momentum can still be modelled realistically by the microprocessor-based unit(s) as it has a direct feed of the momentum of the flywheel therefore the simulated bicycle will depict the same momentum, i.e., will slow down at the same rate as the flywheel.

With regard to technical training, the provision of both devices is also important, for example, when landing the simulated bicycle from a simulated jump or drop, the user should stop pedaling while in the air and to prepare for landing. If the user appropriately stops pedaling, the microprocessor-based unit may depict a safe landing, otherwise it may depict a crash landing. This also prevents "cheating" by pedaling while in the air, when automatic systems will adjust the resistance to pedaling to minimum/zero. On a treadmill this may provide for different stride patterns to be trained. Again, this gives greater realistic simulation, technical training and distractionary features to the system.

Seat On/Off and Weight

A further input device may be provided which is adapted to produce a signal indicating whether or not a user is seated or is standing when using the exercise apparatus. This may comprise a pressure sensitive switch which may be mounted within or on top of the seat covering and connected by wire or a wireless connection to controller main body. The input device may then detect when the user is in the seated position to enable training programmes. As with all the other input devices this may be built in/to the exercise device or may be retrofitted, i.e. detachably removable. In the case of a cycle apparatus, this device enables the apparatus to provide technique training in conjunction with, e.g., the weight forward/back control for ascending slippy inclines. This signal also enables structured training sessions whereby "jumping" is used to increase exertion levels for set periods. For example, the program may produce a display which indicates that a user should stand at a predetermined point. If the signal produces indicates that this movement has been performed the display may indicate a reward for the user. If not the user may be penalised.

This may be a pressure sensitive switch which produces a signal to the microprocessor-based unit(s) indicative of whether the user is seated on the equipment or standing. It functions, works, communicates and is provided in the same ways and means as described above for all devices and, again, can be by whatever sensory, output and communication means and can be integral, snap on, attachable or basic. It may be integrated into a seat cover, integrated into a full replacement seat or may be part of the features of the full seat and seat-post system.

It enables more structured training whereby the user may be required to pedal standing up, maybe against greater resistance, for a period of time as part of the user's program. This input device enables the microprocessor-based unit(s) to audit the fact that you have performed this activity, for advancement or output purposes. This is important to the actual physical exercise as pedaling whilst standing on the pedals exercises different muscle groups and provides for greater upper body exercise too. It is required as another aspect of control for the user, with more distractionary properties, and provides for a "break" in the training.

With regard to technical training, e.g. landing a jump, not only should the user stop pedaling as discussed earlier but also they should be off the seat preparing to take the shock on landing. If the game senses that the user is not standing for landing it may depict a crash landing, with all the simulation devices and the display/speakers. Further benefits come from this device by way of simulating freestyle (tricks) using the system. For example, if the user pedals hard and pulls back on the bars to initiate a wheelie, if seated the game can depict a seated wheelie, if the user is standing, a standing wheelie can be depicted.

The system may further be able to detect the weight of the user. This may be used to set up the personal settings for that user in a home use setting or, in the commercial application, may be used to automatically set up the handlebar and seat resistances to match them to the user.

HRM Sensory Means and System

A further input device may be provided which is adapted to produce a signal indicative of the users pulse rate. This may be a switch mounted within an ear pulse sensor connected by wire to controller main body OR by pick up device in controller main body receiving signal from a chest belt type pulse detector transmitter. It may be provided as an attachment to controller main body OR chest belt type pulse detector transmitter. Enables a safe monitored training session which will stop the programme if, e.g., the heart rate goes too high. The microprocessor based unit (integral or external) may automatically decide when the safe threshold has been exceeded based upon data stored in memory about a users physiology, i.e. Weight, resting pulse etc. Also enables "Zone Training" whereby the heart rate zone, dependent on personal settings input to the Memory Unit, is used to set exertion levels for set periods. It also enables the calculation of professionally set fitness levels and training programmes to be provided using static measurement or active measurements of a users abilities.

This may include biosensor means, connected to the user's body by ear clip, chest belt, hand grip, or whatever type devices, which sense and/or measure the heart rate of the user and produce a signal representative thereof. The user's existing heart rate monitor being connected to my games controller may provide this. These sensors communicate the readings to the reader unit by whatever means, hardwired, IR, radio, etc. The reader part of the system receives this signal by what ever means and communicates this reading to the microprocessor-based unit(s).

It functions, works, communicates and is provided in the same ways and means as described above for all devices and again can be by whatever sensory, output and communication means and can be integral, snap on, attachable, connectable or basic. The heart rate system, as discussed earlier, may be direct or by via a threshold system to the integral and/or external microprocessor-based unit.

HR Monitor or Exercise Controller

Including such a device provides great safety and exercise benefits to the user. Users like to either train with reference to their heart rate, view their training heart rate achievements or simply know that a device is monitoring their heart rate and will warn them if the level is too high, or even too low. It also provides for safe exercise gaming, ergometer properties and functionalities, heart rate zone training methods and for more accurate calorie consumption measurement.

The prior art limit themselves to using the heart rate monitor system as a device to adjust the exertion levels of the user in accordance with internally preset zones and levels. Once the user hits what the system has previously calculated to be the user's maximum heart rate zone level, the system will then reduce the resistance of the equipment to reduce the user's heart rate, there is therefore no incentive to push harder and no ability to undertake anaerobic training, which is generally at much higher heart rates. My games controller keeps the heart rate system as a defined input means not within a closed loop system. The system, via the internal or external microprocessor-based units, can read this input independently and can either use this to control the training program (as like the prior art but not limited to this) or as a simple monitor which allows for realistic live exercising but with the benefit of live monitoring and warning systems. It may also provide a combination of both.

Fitness Measurement

The provision of the heart rate monitor in such an integrated system further enables the microprocessor-based unit(s) to calculate the user's fitness level and appropriate optimal training heart rate zones. Most users may be not knowledgeable enough to work out their own zones. The microprocessor-based unit(s) can run an appropriate program, with reference to the user's age, sex, weight, etc, and can set the appropriate workout for the user to perform, i.e., certain speeds, cadence, resistance, etc, to enable the system to calculate the user's functional capacity. The user's personal data may be stored on the integral and or the external memory means and may record the user's age, sex, height, weight, chest size, blood pressure, activity level, training history, exercise objectives, etc and use these to set an approximate Max-Min Zone, Target Zone, etc. which can then be monitored, modified and updated through scheduled fitness and zone measurement programs or through performance in standard training programs/games.

This ensures that the zones and limits will be monitored and updated in real time with the user's exercise program, automatically, by the system, without the user needing to schedule, re-perform and re-input this themselves. The user's exercise preferences and objectives may be used to select the type of programs to run, personalise the programs or set the zones/limits or simulation/exertion resistance modes. This therefore provides for structured and/or monitored safe training methods. It also provides relevant data for rehabilitation, physiotherapy and health professional review as actual exercise data may be recorder easier and can be communicated easier through my games controller. This also gives benefits to the Managed Health Care companies who may demand that a "customer" help himself or herself, through a structured training program.

Live Training

This "live" training method is more realistic to the user, it is more challenging but the progression is far more satisfying. Athletes perform at their best in competitive situations, the advantage here is that, unlike the prior art where the heart rate monitor system is part of a closed loop controlling the user's exertions, the system here provides another live input which can be used whatever way the user decides. As the prior art provide a closed loop with the resistance system, they are do not provide a real piece of training apparatus for the fit people wanting further real training, the kids who have the energy to push, and the fact that is users were performing the exercise in the real world their exertions would not be limited by computer controlled systems. My games controller is designed to enable people to interactively train as per the real sport world and assist self-motivation. If really riding a bicycle up a steep road, no one will flatten the road for you because your heart rate goes too high as judged by some computer or generalised method, you will just have to lower the gear as much as you can, put your head down and pedal, pedal, pedal. Once you get to the top you have a great sense of achievement, which only serves to motivate you more!

The provision of the integral connectability enables the Any Game mode of training, which again may be run as a zone training session, a live training session with active monitoring, or a combination of both, in accordance with the internal microprocessor-based unit's software.

Overall the heart rate system provides for greater usability of the equipment, providing a safe, monitored, recordable and auditable training system, which is more realistic and fun.

Resistance Setting Reader(s)

A further active input device, or devices, may be adapted to produce a signal indicative of the level of resistance that the exercise device is providing against the users movements. This may comprise a position sensitive reading switch device adapted to detect the position of a lever or knob that can be moved by the user to vary the resistance. This signal enables proper varying force training without requiring the full automatic system as the console can read actual tension setting. Therefore structured exertion level training programmes or pure races can be properly "played" through on manual tension control machines. Also, on the automatic geared machines it may inform the Console of gear selected and timing of changes, to enable technique training.

This input device represents a position sensor that reads the resistance, incline or gear, or handlebar, seat or brake resistances, manually selected by the user on the exercise equipment. It is specifically designed to bring all the functionality of my games controller to all types of manually adjusted resistance exercise equipment and Trainers.

It functions, works, communicates and is provided in the same ways and means as described above for all devices and, again, can be by whatever sensory, output and communication means and can be integral, snap on, or attachable. Specifically this device is designed/configured within/to/around a manual lever, knob, twist grip, or what ever type of manual resistance adjustment means may be present on the exercise apparatus, and is calibrated over the full range of adjustability of the device. This may also be a cover over buttons on a exercise device which provides button controlled resistance adjustment or may be a communicator device, communicating and therefore reading the resistance setting on such devices. The sensor therefore is able to read what level of resistance the user has selected. It may be an attachable device which covers the existing manual control lever, or connects to an exposed portion of the resistance adjusting cables, or it may be supplied as a replacement to the existing control or it may be integral or by whatever means. The sensor may provide an analogue signal or a coded digital signal, direct or via the 3D Shock Box De-Coder unit as discussed later, to the microprocessor-based unit(s) which is representative of the level of resistance selected by the user. The analogue unit may provide a direct analogue output configured over the adaptor/controls range of motion or in the digital system it may read the position by whatever means, analogue or stepped digital, and convert this reading, via the De-Coder box to a pulsed signal along one input line to be read by the microprocessor-based unit(s).

To calibrate the resistance means and levels, a configuration program may be run by the microprocessor-based unit(s) which requests a measurement of the force/weight required to move the exercise mechanism against the resistance over a range of resistance settings whereby the microprocessor-based unit may then recommend adjustments to the resistance control to bring the resistance levels at different tensions into line with it's requirements. Other methods of course may be provided, even where the user must set the resistances such that, e.g. the placement of one common household object on horizontal pedals at tension setting X will cause rotation of the pedals, this may be repeated over the entire range of settings. From calibration techniques such as these the microprocessor-based unit(s) can map from their required resistance settings, per the simulation/training program, to what setting the user must select so as to achieve uniformity in resistances, forces and energy required over all exercise apparatus and resistance systems. This enables full simulation in a retro-fit embodiment.

This novel feature enables proper structured variable resistance and exertion level simulations and training programs, and the audit thereof, to be performed on manual exercise equipment, therefore negating the need for costly fully automatic pieces of equipment. It serves for those who cannot afford these automatic machines, those who want to try the system first and those satisfied with their existing manual exercise equipment. No prior art disclose anything in this regard at all, they are either the costly fully automatic integrated pieces of equipment, or, the resistance setting on the equipment bears no significance to the simulated world. The calibration also ensures that user's are not exercising against too low or too high resistances, as may be the case with a video based exercise.

The microprocessor-based units can therefore instruct the user as to the resistance setting to select via live instructions and can read what resistance setting the user has selected which may be incorporated into the program. This may be processed in different ways, for example, it may be within a structured training program which warns the user, via the display and/or audio signal, of an increase in resistance, if the user does not do so the program will regard this as the user not properly completing the given program (therefore not allowing advancement to the next level). Otherwise, it may be incorporated to represent the user changing the simulated gear selected. In the above example, the user not increasing the resistance may be processed as a request to therefore shift down in gear on the simulated bicycle, therefore reducing the simulated speed of the user for the given speed/cadence readings. This may affect the users chances of successfully beating the simulated opponent and progressing. The simulation may return the user to "full speed" once the required tension matches that selected. If the above was a decrease in tension but the user kept the equipment in a higher resistance setting, this could be processed as changing up in gear therefore increasing the simulated speed at the given speed/cadence readings. Users can therefore progress at their pace through whatever simulated world they may be in.

Gear Sensor(s)

With regard to Trainers, i.e. those real road bicycles adapted to behave as stationary exercise bicycles, this sensor is exactly like the Resistance Setting Reader as discussed above but it senses and provides a signal representative of the actual gear selected on the bicycle. With regard to other exercise equipment it senses and provides a signal representative of the "simulated" gear the user requires and communicates this to the microprocessor-based unit(s). On exercise equipment, these may be regarded as further gaming input devices, controlling the simulated gear.

On Trainers it works in the same way as the Resistance Setting Reader, on other equipment it may be a lever (with integral RSR-type device) or may be digital up/down switches or whatever sensory, output and communication means. It can be integral, snap on, attachable or basic. This may of course be provided by the twist grips in exercise modes, simulating the twist grip gear changers.

On the Trainers, it provides for more real measurement of the actual exertions/outputs of the user and therefore can provide better simulation and technical training. On the automatic equipment versions, this increases the possibilities in the simulated environment immensely. If the simulated world's resistance setting is too low or high for the user, as per a simulated course, they can select to increase or decrease simulated gear respectively. This will cause their simulated speed to increase/decrease while the automatic resistance control will increase/decrease the resistance setting to reflect the change of gear. Again, this is a completely independent input selector, which enables the internal/external software to fully control the tension in a more realistic simulated world, giving the user more incentive to push harder to win, albeit against harder resistance or the option to take it easy and look about. It also provides for technical training in the skill of proper gear selection and the timing of gear changes.

Torque Reader

This is a device that senses and measures the actual power/force being applied to the cranks of a bicycle, oars of a rower, etc. (for instance measuring crank deformation) and communicates a signal representative thereof to the microprocessor-based unit(s), directly or indirectly. This therefore provides the system with a reading of actual energy being expended at a given resistance.

It incorporates all the options, wiring, communication and attachability features of all devices and works by industry standard engineering means, such as crank deformation readings, etc. Like the Resistance Setting Reader it may work through providing a direct analogue signal or a coded digital signal representative of the force/energy to the microprocessor(s).

The benefit of this is that it provides for enhanced calorie consumption and power output readings but it also would provide for automatic calibration of the manual or automatic resistance mechanisms.

Control Input Devices

In addition to the active input devices, the controller may also include one or more control input device may include devices that are adapted to produce signals to the microprocessor that run the sport technique simulation and game control side of the system. They provide the interface for the important technique/control factors which convert the users control movements into an input signal to be processed by the computer.

The Control Input Devices cover any one or more directional and rotational controls applicable to the simulated environment. They sense the Steering, Weight Distribution, Lift/Drop, Yaw, Sidestep and Braking control inputs. They read and measure the inputs being applied by the user and supply a signal representative thereof to the microprocessor-based unit(s) to run the sport, fun and technical simulation/game control side of the system.

Handlebars—Moveable and Sensory Means

In the case of an exercise cycle apparatus the control devices may comprise an integral part of a handlebar assembly. They may comprise position sensors that are mounted within adjustably stiff, progressively sprung, return to zero hinging or otherwise movable mechanisms that detect force applied or movements to the handlebar assembly by the user. It is preferred that the output of these devices is analogue in nature, i.e. they give a progressive output dependent on how much they are moved by. They may also have internal bump stops and may be lockable to enable autopilot training. This option allows a user to concentrate on the physical training rather than the skills. In the case of a bicycle displayed on a screen it would automatically keep the bicycle on the correct course yet allow the user to control the speed through the pedal effort being made.

The preferred embodiment provides for a novel handlebar games controller device that can turn left/right ("steering"), lift up/down ("jumping/ducking"), bank left/right and lean forward/backward ("weight distribution"), and slide left/right ("side-step") about a series of pivots, extendable/compressible stems and slidable housings. These movable means are arranged in such a manner as to realistically represent the handlebar based control inputs that a real mountain-bike rider may perform. This would also simulate the feel of front suspension on a bicycle. The handlebars also provide two levers, functionally the front and back brakes, as discussed later.

They may be positioned in such a way around/as part of the handlebar stem/brake levers as to ensure the user has to be more involved in the game by requiring realistic movements to work them. The hinges are set up as to provide a very involving nature to the game. In the real world you have to be quick and firm in weight distribution changes and have to physically move over a large radius. This will make the user more involved in the game rather than his tiring legs and also means the user will be learning real world control techniques. They also provide for freestyle technique training, e.g. to wheelie you must pedal hard while shifting weight backwards and then balance it by carefully balancing pedal power and brakes. Further, this provides for substantial, adjustable and progressive strength and flexibility exercise and training.

The handlebar assembly including the control devices may be available for retrofitting conversion of a users' existing exercise bike or built into an exercise bicycle. On the more basic systems these will be simple joystick/button controls mounted via Snap On kits or Bracket Mounting Basic Interactive Controllers. This example explores the full handlebar system.

The handlebar assembly may include a quick-release mechanism that allows it to be quickly and easily removed from an exercise apparatus.

It is also envisaged that they may be "switchable" in that the user may select an "autopilot" mode, and possibly lock the controls in place with the locking means as disclosed later. In autopilot mode the software may automatically provide the appropriate directional, weight controls, etc to enable to user to concentrate on the purely physical side of driving the simulated character and/or to learn the appropriate methods to negotiate the course. Perhaps, by on-screen and/or aural input requirement displays.

They are sensors that detect the required activity/control input. They may be set within this upper body exerciser and simulator via integrated standard components in the handlebar and seat units, connected by cables to them or may be simple directional control devices integrated into Handlebar Grip/Lever Housings, Seat Covers and Units and/or Basic controllers. It is the preferred embodiment of my games controller that the unit housing the control input devices also houses the Gaming Input Devices, System Input and Output Devices and Simulation Output Devices, the integral Microprocessor-based unit, attachable/integral Memory and the integral Display means. All other options may be connectable hereto.

It should be understood that these sensors may be provided without the handlebar system as above but still under the spirit of this invention.

My games controller provides realistic control input devices about a handlebar/stem device for:

Weight Forward/Backward (Pitch) Input Devices-Control about X-Axis,

As per the first aspect, the controller may include one or more input devices which are adapted to produce signals indicative of the distribution of the weight of the user on the exercise device. This may be a modified joystick mounted within/by cable to the sprung hinge mechanism in the handlebar stem and is hinged about same point as this hinge mechanism and has flexible ends to prevent knocks—measures the amount by which the user is moving his weight towards the front/rear of the bike. It may be built in/to be retrofitted by user/as basic button/lever controlled pad/Snap On attachments.

Turn Left/Right (Steer) Input Devices—Control about Y-Axis,

As per the first aspect, the handlebar assembly may also be adapted to provide signals to the microprocessor-based apparatus indicative of the user pulling the handlebars to the left or to the right. The controller may therefore include at least one angular position sensor, which may be mounted within/by cable to the sprung hinge mechanism in the handlebar stem. It may be hinged about same point as this hinge mechanism and has flexible ends to prevent knocks—measures the amount by which the user is turning the handlebars left right to point the "bike" in the right direction. It may be built in/to be retrofitted by user/as basic button/lever controlled pad/Snap On attachments.

Weight Left/Right (Bank) Input Devices—Control about Z-Axis,

As well as measuring whether the users weight is forwards or backwards on the device, as per the first aspect, it may also produce a signal indicating whether the weight is to the left or the right. Again, this analogue movement detection rheostatic lever device—working through an analogue joystick type device—joystick mounted within/by cable to the sprung hinge mechanism in the handlebar stem and may be hinged about the same point as this hinge mechanism and has flexible ends to prevent knocks—measures the amount by which the user is moving his weight to the left/right of the bike to initiate banking. Comes built in/to be retro-fitted by user/as basic button/lever controlled pad/Snap On attachments.

Lift Up/Push Down Inputs—Control Along Y-Axis,

The handlebars may be may further be adapted to move up and down relative to the support in a plane substantially orthogonal to that for left/right rotation, that is lifting up or squeezing down the bars (substantially along the y-axis). In use this may be a substantially vertical axis. A further input device may be provided accordingly. This may be a modified analogue joystick device mounted within/by cable to the extending/compressing mechanism in the handlebar stem and is configured about same point as this movable mechanism and has flexible ends to prevent knocks—measures the amount by which the user is lifting or dropping the front of the bike. It may be built in/to be retro-fitted by user/as basic button/lever controlled pad/Snap On attachments. Specifically, this provides for realistic control of any object in a 3D world—LINEARILY ALONG THE Y AXIS. This simulates lifting or pushing down the front wheel on a cycle and can be used to control simulated jumping and ducking on the ground.

Sidestep Left/Right Inputs—Control Along X-Axis,

Furthermore, the handlebars may be adapted to move to the left and right relative to the support in a plane substantially orthogonal to that for left/right rotation, that is sliding the bars out to the left or right (substantially along the x-axis). In use this may be a substantially horizontal axis. A further input device may be provided accordingly. This may be a modified analogue joystick device mounted within/by cable to the extending/compressing or otherwise sliding mechanism in the handlebar stem and is configured about same point as this movable mechanism and has flexible ends to prevent knocks—measures the amount by which the user is "sidestepping" the front of the bike. Specifically, this provides for realistic control of any object in a 3D world—LINEARILY ALONG THE X AXIS. This simulates the "Sidestep" control that may be performed whereby a cyclist may move the bike under them in a sideways manner, generally in the air or when jumping on the spot.

The Control Input Sensory Devices, as above, may be set within or connected to these movable means. They function, work, communicate and may be provided in the same ways and means as described above for all devices and as further explained with specific reference to Control Input Devices above. Again, they can be by whatever sensory, output and communication means and can be integral, snap on, attachable or basic. In the preferred embodiment, they may be industry standard analogue joystick devices simply built into or connected to the respective pivot, within the handlebar or seat units, with sprung or bump stop protection devices, which therefore move this joystick directly when the pivot is moved. This provides cost and durability benefits and also negates the requirement to calibrate the steering mechanism with the potentiometer.

This level of controllability and the more realistic simulations that can be produced there-from; enable the user to learn actual techniques required for the control of a real mountainbike or BMX, allowing for the realistic simulation of freestyle techniques also. As the controls are about realistic frames of reference for the user, this technique training will be advantageous for the real world and would build their confidence, strength and reaction times. The greater controllability and requirements therefore also increase the mental distraction for the user away from the exercise. As the exercise may provide for greater speed of travel along one or more of the axes (by exertion controlling movement speed as a direct input or by limiting other inputs) it is envisaged that this will encourage the user to exert themselves more in this regard, rather than being focused on the downside of this exercise.

My games controller provides a realistic simulation, which is more mentally involving for the user and provides for greater fun through the technical training and freestyle possibilities this novel controller provides. It can therefore enhance a user's technical knowledge and skills. This is not possible with the control features as provided by any prior art. For example, when descending a steep, slippery simulated descent, the user should pull the bars back, transfer their weight over the rear wheel, use the back brake only and be off the seat not pedaling. Or, to perform a trick, for example a 360-degree spin in mid air, substantially about the y-axis, the user should cycle hard towards a jump, maybe press the trick button, but just before the top of the ramp twist the bars in one direction, press and release the jump button (or lift the bars) then be off the seat while not pedaling and holding the bars and twisting against the seat, for the direction and duration of the spin until pointing straight again when they release the bars and seat and pull the bars back to transfer their weight over the back wheel to land safely. They may then sit down and start pedaling again. If the user happened to bank the bars in any direction the computer may depict a flat 360-degree spin whereby the bike is horizontal rather than vertical. If the user also happened to pull the bars back vigorously at the top of the ramp, maybe also seated, the computer may depict a flat 360-degree spin within a back flip, substantially about the x-axis. If going fast enough/high enough the user may hold any/all of these to perform 540 or 720-degree or more trick or may perform a further trick within the same jump.

The Trick button may initiate this mode or may augment the range of controls effectively doubling the range of tricks performable, e.g. also pressing the trick button in the above, may depict a hands-free trick as per the above, or, this may be provided by further specific Input Devices.

Supporting Means

The system may be provided as main unit with a standard handlebar stem fitting. This is prime to the novelty of my games controller in terms of its retro-fittable nature. Prior Art's attempts at such control devices do not provide for all the control device sensory/resistance means to be incorporated into the handlebar unit or remotely connected thereto. With such standard supporting means this enables use of the system by itself as a games controller, with any exercise equipment what so ever and with any roadworthy bicycle also. This may be connected to any such supporting means at the users disposal and in accordance with their use of my games controller.

In the embodiment as a pure games controller the unit may be connected via this stem unit to a table mounting device, incorporating such clamps, suckers, etc as required to enable secure mounting to a table or such.

In the embodiment as a connection to exercise equipment the stem may connect directly or via an adapter receiving/connecting bracket to fit to that particular type of SEB. This may be a full front support, or just an adapter for the bars—bracket—where old bars were fitted, or where the old bars were cut and the system bolted thereto with a standard attachable kit.

If fitting to a roadworthy bicycle, modifies to behave as a stationary exercise bicycle, a Trainer, the user would place the bicycle on existing stand/trainer system, undo the standard handlebar stem bolt, remove the real bars, then bolt in the Handlebar System of my games controller, which has at the base of it's stem a bracket/hole to mount the real bars into while training with the system.

In all embodiments the user may then fit the Seat Unit, be it the Seat cover/New Seat or Complete Seat/Stem system and, in the case of full exercise embodiment, then fit or connect the appropriate Active Input Devices and any remote Simulation Output devices to the existing bicycle or exercise equipment by the appropriate means. The software in the microprocessors On-Screen Settings, and Display Settings, Screens may be then used to configure the system to the appropriate settings for the user, their equipment, their embodiment and their preferences.

Levers

The handlebar assembly may further include one or more levers which can be operated by a user. Two such levers may be provided, one towards each end of the handlebars. Each lever may be adapted to produce a respective input signal dependent upon the position of the lever, i.e. its movement when pulled by the user.

The levers can be used to simulate the brakes of a bicycle. They may comprise an actual brake lever attached to a suitable switch or potentiometer to produce the input signal, or may be custom made and include an integral switch. These devices also provide the same features as the handlebar movable mechanisms.

The controller may be provided with one or more brake levers and a signal may be produced indicating that the user has moved the brake lever to apply the brakes. Again, this may be through an analogue movement detection rheostatic lever devices—working through an analogue joystick type device—joystick mounted within/by cable to the sprung hinge mechanisms in the left and right brake levers and is hinged about same point as hinge mechanism and has flexible ends to prevent knocks—measures the amount by which the user is applying the front and rear brakes. Optional connection from these to the Brake Shock mechanisms. This simply sends a copy of the output signal to these shocks which vibrate to emulate brake judder. Comes built in/to be retrofitted by user/as basic button/lever controlled pad/Snap On attachments.

The preferred embodiment further provides two levers at the end of each side of the handlebars to represent the normal front and back brake levers of a real bicycle with all the functionality and features as per the handlebar pivot mechanisms and pick-up means and methods. It is also envisaged that two touch sensitive or digital button switches may be provided instead of levers. They come in all the forms, methods and means as per all devices as described above, again, they may provide analogue or digital signals as sensed by whatever sensory means, remote or integral to the equipment or controller main body, communicated by whatever communication means and can be integral, snap on, attachable or basic. It is also a preferred embodiment that the lever mountings also mount and house the System and Gaming Input Devices.

It should be noted that the system provides for handlebars that may have only six degrees of freedom, two are then provided by the pedals/brakes, two by buttons and two by seat sensors. In the system's application to cover control in any game, this still provides for realistic 6D control (3D rotational and 3D directional control). In a further embodiment without the seat unit, the levers may provide the X-axis directional control.

Dual Stage Resistance and Output

Each brake lever may produce a two stage "stepped" analogue output signal that initially simulates the levers taking up cable slack, then moving the brakes towards a wheel and then applying force to the wheel to slow the bicycle. The levers may include a variable resistance that simulates the different forces required during each stage of the application of the brakes. This may incorporate a dual stage, stepped as well as progressive and analogue, resistance to pivoting and outputs there-from. This simulates the real feel and control of brake application. The first resistance stage may be very low and only slightly progressive over an initial range to simulate the slack/free play between the brake pad and the wheel rim. Further application will be against the second stage of resistance/damping against stiff progressively sprung, return to zero hinging mechanisms optionally with progressive twist dampers. The sensor may send no signal over this first range, as the brakes are not applied yet. When the second stage is encountered, the lever moves the integral or connected joystick device from zero through its full range therefore providing an analogue signal representative of the brake pressure being applied by the user.

Like all the Control Input Devices, simulation is greatly enhanced, as is the level of mental involvement and distraction. Further upper body (grip) exercise is provided and the user can exercise greater technical and freestyle control. This will help the user's braking knowledge, skill and confidence with regard to the proper application of the proper balance of front/back brake with the proper force. For example, when descending a hill or in slippery conditions the user should apply mostly the back brake. For freestyle this enables, endo's, pogos, etc.

Seat Unit

The controller may also include a seat or saddle assembly being a seat cover, replacement seat or a replacement seat post device. The seat/saddle assembly may include one or more sensors which produce an output signal indicative of the weight exerted by the user on the seat/saddle. It may also produce an output signal when the user exerts a force on the saddle to move it to the left or the right or up and down. The output produced due to left/right or up/down movement may appear to the microprocessor-based unit to be the same as or a portion of the signal produced by rotation or forward/backward movement of the handlebars. This allows for this level of controllability with current games controller functionality. For example, the turning of the handlebars may be configured to use a percentage of the range of analogue control of this input line, the seat left/right taking up a different range and both together a further range.

Seat—On/Off Input Device,

Seat—Weight Input Device,

This seat device provides further input devices adapted to produce a signal indicating whether or not a user is seated or is standing when using the exercise apparatus and/or a signal representative of the users weight.

Rear Sidestep/Yaw Left/Right Inputs—Control about the Y-Axis or Along the X-Axis, The seat cover or seat may provide further input devices responsive to the user exerting force against them along a substantially horizontal axis. This provides for provide for such left/right control inputs (substantially along the x-axis). An input device may be provided producing a signal indicative of the left/right force against the seat. Further, a seat post may be provided that is adapted to move horizontally relative to the support (substantially along the x-axis). A further input device may be provided which produces an output indicative of the left or right movement of the seat. Specifically, this provides for further or alternative realistic control of any object in a 3D world—ROTATIONALLY ABOUT THE Y AXIS or LINEARLY ALONG THE X AXIS. It may be in place of the handlebar slide left/right function or augmenting it. In a bicycle simulation this provides for the "bum-steering" method of cycle control, for rotational control while "in the air" and provides for simulation of real world freestyle techniques.

Rear Lift Up/Push Down Inputs—Control about the X-Axis or Along the Y-Axis,

Further, a seat post device may be provided that is adapted to move vertically relative to the support (substantially along the y-axis), perhaps also moving horizontally to provide the above seat left/right inputs. A further input device may be provided which produces an output indicative of the upward or downward movement of the seat. The user may therefore push down or lift up the seat, i.e. the rear of the bicycle. Simulating the user putting more weight through the seat, for instance when climbing on slippery surfaces, or lifting the rear of the cycle in a jump. This may also incorporate the seat on/off and weight functions. Specifically, this provides for further or alternative realistic control of any object in a 3D world—ROTATIONALLY ABOUT THE X AXIS or LINEARLY ALONG THE Y AXIS.

This may be a seat cover or replacement seat device, which incorporate the Seat On/Off and Weight Active Input Device, and the Yaw left and right Control Input Devices. The seat/saddle assembly may include one or more sensors which produce an output signal indicative of the weight exerted by the user on the seat/saddle. It may also produce an output signal when the user exerts a force on the saddle to move it to the left or the right or lifts it up or pushes it down.

These input devices may specifically be flat, thin flexible digital or analogue pressure sensitive pads built into the seat cover or seat. This may also be provided by a Seat/Seat Post device, which may suspend the seat, by pivots and or a compressible/extendible stem, to provide a suspension feel and measurement of sitting/lifting forces (therefore also Weight and On/Off Seat), and may pivot, as per the handlebar device, about a left/right angle, as depicted in the drawings, providing the yaw control, whereby the seat can be moved in a left or right direction also. These are provided with all the functionality and features as per the handlebar pivot mechanisms and pick-up means and methods. The preferred embodiment of my games controller is a retrospectively fittable or integral, supported one-piece unit of such movable handlebars, including a stem, with remote wiring to the Active Input Devices, Simulation Output Devices and a Suspended Pivotable Seat Unit.

They function, work, communicate and may be provided in the same ways and means as described above for all devices and again can be by whatever sensory, output and communication means and can be integral, snap on, attachable or basic.

The benefits of the Seat On/Off device are discussed earlier in the Active Input Devices section. With regard to the full controllability of a simulated vehicle/object/user about and along all three dimensions, the Seat Left/Right device represents the $6^{th}$ dimension of control, that being Yaw, i.e. rotate left/right about a substantially vertical axis. Significant in simulating while in the air turning the handlebars has little effect.

Seat Unit—Pivoting, Extending, Compressing and Suspending Means

As discussed above, the seat may pivot left/right ("bum-steering") and lift up/down ("seat lift/drop") about pivots, extendable/compressible stems and suspended seat housings, in such a manner as to realistically represent the seat based control inputs that a real mountain-bike rider may perform. This would also simulate the feel of rear suspension on a bicycle. The inputs referred to above may be a modified analogue joystick device mounted within/by cable to the pivoting, extending/compressing or otherwise sliding mechanisms in the seat post or stem and is configured about same points as this movable mechanism and has flexible ends.

Full Unit Overall

Taking the handlebar system, including the levers, and combining this with the seat unit, the real world mountain-biking (bike based) control inputs are thus provided for, within removably attachable, upper-body exercising game controlling apparatus. This enables provision of such software as to properly simulate the physically and mentally challenging sport of mountain-biking. With regard to prior art, most only provide steering control, some provide up/down control but none provide for the weight shift, or yaw control. Most do not incorporate brake control either. Some provide for seat control but this is instead of handlebar control. Clearly the prior art are lacking in their controllability and ability to simulate the real world control inputs required, therefore their ability to perform technical and freestyle training/gaming.

All the control inputs are independent of each other. It is envisaged that all these movable means may also be incorporated into one integrated handlebar unit, which moves in all these directions and has an extendable/compressible stem and one integrated seat unit. It should also be understood that the structure as disclosed in the drawings is an example structure, the pivots may be arranged in whatever manner most appropriate to the designed use.

Twist Grips

These are normal analogue control potentiometer, similar to that found in a joystick but specifically similar to the devices within a steering wheel game controller, but providing for analogue, or digital, control input signals as proportionate to how much they may be twisted backwards, or forwards. The twist grip may be provided in duplicate, to cover both front and rear derailleur selectors or to further enhance game control. These alternative embodiments may be bespoke to each such twist grip or the device may allow selection of these alternative features. They may be integrated with the equipment or removably attached by whatever means.

This device functions, works and is provided in the same ways and means as described above for all devices and, again, may provide analogue or digital signals as sensed by whatever sensory means, remote or integral to the equipment or controller main body, communicated by whatever communication means, feeding directly or indirectly to the external and integral microprocessor-based units integrated or removably attachable.

It maybe used to enhance use of the system in Game Only mode, replicating the twist grip accelerator control of a motorcycle to control a throttle in any game. Or it may be used as a thrust forward/backward control. As discussed later, this may be of return to zero nature or may be static, ie movable but not returning, like a flight simulator style throttle control. As a further alternative this device may provide for indexed positions about its degrees of freedom, similar to the twist grip style gear changing devices on mountain-bikes and therefore emulating them. This may of course simulate the twist grip gear changers and used accordingly.

Resistance, Springing and Damping Means—General

The handlebars turn left/right ("steering"), lift up/down ("jumping/ducking"), bank left/right and lean forward/backward ("weight distribution"), and slide left/right ("sidestep"), and the seat pivots left/right ("yaw") and lifts up/squeezes down ("rear lift/drop") about a series of pivots, extendable/compressible stems and slidable housings, in such a manner as to realistically represent the control inputs that a real mountain-bike rider may perform. This would also simulate the feel of suspension on a bicycle. The handlebars also provide two levers, functionally front and back brakes, as above and 2way twist grip control devices.

These movable mechanisms may be set up in such a manner as to require realistic body movements to control, with resistance and damping means, such as springs, dampers, centralisers and internal bump stops, incorporated to resist movement about any of these pivots so as to provide for an integrated piece of upper body exercise equipment in its own right as they require the user to expend energy to overcome this resistance to move the device and to hold them in place against the resistances.

The resistance and damping about these devices may be by whatever means but generally by preset, user adjustable or automatically adjustable; progressively sprung, return to zero hinging or extending/compressing mechanisms with progressive dampers. The springs and dampers may be internal or connected to the hinging mechanisms by whatever method, cable, hydraulic, etc. The springs may be of the twist, compress or stretch spring varieties or could be magnetic and should have preload adjustment at least. They may also be provided by way of elastomers or other such material. The damping may also be by whatever means, by twist dampers, hydraulic dampers or whatever damping means and may be adjustable for compression and rebound damping.

Resistance and Damping Means—Free, Non Return

As a further novel feature, my games controller provides for an alternative to the return to zero set up as described above in that one or more of the handlebar control input devices may not be of the return to zero nature but includes substantial, adjustable resistance to movements without a return to zero function. The return to zero function may be disconnectable and may be automatically controllable by either microprocessor. This will negate the need for the user to exert force against the resistance to simply hold the control in place when moved away from the central position. Sensors return the appropriate signal for that position. This provides for a cheaper unit through omission of the springing features and also allows for more involved use in flight simulation style games.

Resistance and Damping Means—Spinning, Non Return

As a further novel feature, my games controller provides for a further alternative to the return to zero set up as described above in that one or more of the handlebar control input devices may not be of the return to zero nature but may be "spinnable", i.e. freely rotating through 360 degrees. This function may be automatically controllable by either microprocessor and may further be without the resistance. The resistance, in the automatically controlled embodiment, may be controlled so as to provide little or no resistance when the simulated bike is in the air. This will again negate the need for the user to exert force against the resistance to simply hold the control in place when moved away from the central position but provides for a "freestyle" unit whereby the user may spin the bars as would be done in BMX style freestyle techniques. Sensors return the appropriate signal for the position. This will broaden the appeal to children especially. If in a freestyle game the user spins the bars to improve a trick but fails to catch them correctly before landing, the game may depict a crash.

Degree of Required Movements

As discussed above, the preferred embodiment has the handlebars set up in such a way as to require the user to make realistic body movements to input the desired control signal. This will therefore provide a more enjoyable, active and involving nature to the gaming side of the training program or game and fully represents the real world in terms of the movements, exertions and actions required to control a real mountain-bike. In the real sport, the rider must be quick and firm with their steering controls and weight distribution changes and must move their upper body over a large radius to successfully negotiate tricky terrain, this system enables full simulation of this. This provides greater mental involvement and upper body exercise, distracting users from their legs' exertions.

This degree of required movements, and also the provision of the resistance and damping means, also provides a greater variety in the muscle groups in the upper and lower body exercised and stretched by use of my games controller, e.g. Legs, Buttocks, Abdominal, Back, Sides, Arms, Shoulders and Neck. This functionality therefore transforms, e.g. the bicycle, into a cross trainer, capable of both aerobic (and anaerobic) and strength training. My games controller goes even one step further by incorporating flexibility training also. Of major benefit is the stretching of the posterior thigh and lower back, helping prevent chronic lower back pain. The system therefore further provides an all in one exercise device that has aerobic and anaerobic exercise, via the exercise equipment, and strength and flexibility training, via the handlebar, and seat and brake, systems. Note that the stems between movable mechanisms may be adjustable for length, manually or automatically by the computer. This may provide for user adjustment for their size and may further provide additional or alternative resistance adjustment.

Resistance and Damping—Adjustable Means

As disclosed above, the resistances and/or damping against movement of each movable means may be preset or adjustable, this may be further adjustable by the user or automatically by the computer. The adjustability of the resistance and damping also allow the equipment to be matched to the user in terms of their size, weight or strength. A Resistance Setting Reader type device may also be incorporated to therefore inform the microprocessor-based unit(s) of the resistance and damping settings. In the automatic resistance/damping control systems this may serve to simulate steering feel, i.e. the effects of inertia, jumping, etc., or to simulate the terrain conditions or damage to the simulated bicycle or whatever. The adjustable nature also serves to make the resistances and damping low for when it is being used only as a games controller.

The value for money of the system comes by way of not only the interactivity and superior games controller benefits but also by way of providing a pure upper body exercising apparatus also. The strength and flexibility training can be achieved through the pure control of the device in a game, whereby a simulated route may consist of such numerous turns, drops, etc. requiring such a number of repetitions of different twists, pushes, pulls, leans etc. as to provide a structured strength and flexibility training program also.

The software may suggest manual increases in the resistance and/or damping settings over time to therefore advance the training this way too. The software or instruction manual may also provide a pure strength and flexibility training program whereby the user performs a certain number of repetitions and groups of repetitions of certain demonstrated exercises, whereby the user must sit or stand, hold the bars in a certain way and position, and pull, push, twist, lean, lift, push down, etc the handlebars and seat thereby exercising or stretching specific muscle groups, as is the case with any piece of strength training equipment.

This provides for a fully interactive and progressive strength training apparatus. The user may "play" through the strength training games or Body Pump style programmes as referred to above. Now, not only does the user receive a reading of their aerobic achievement, in time, distance, etc parameters, but can also get a reading on their strength training achievements, in terms of repetitions of each exercise, at what resistances, and with what quality.

Resistance and Damping—Lockable Means

The handlebars may be also lockable about any or all of their degrees of freedom. The pivoting mechanisms include, or may be connected to, simple locking devices that disable movement about these degrees of freedom. This may be by simple clips, levers, snaps, wing nuts or whatever means. They may be manual or computer-controlled, such that they may always be locked until connected to the computer, which may warn before unlocking them, in accordance with the user's settings, perhaps selected by Voice Recognised Input.

This feature is of significance when the user selects using the system in Game Free mode, or using the "Autopilot" feature in the software, whereby the user purely powers the simulated bicycle, through any one or more inputs, and all, or certain, direction, weight controls, jumps, etc. may be performed automatically by the computer. In Game Free mode, the system substantially upgrades the exercise equipment to a complete computer controlled, monitored, and audited training system.

This brings all the benefits of the computer functionality with or without the external microprocessor-based unit. It makes the system more attractive to the whole family, for them to use, as they desire. Maybe the parents, women, or older or medically motivated users may not want to perform all the Control Inputs but still want the structured, monitored and audited training program, whereby they go through the computer dictated warm ups, variable resistances, zones, speeds, cadences, seating positions, upper body exercises, stretches, etc, with the progressive nature.

Pedal Pressure Sensors

Further Control Input Devices are also disclosed by way of the Pedal Pressure Sensors. These devices may be sensors, by whatever means providing a analogue or digital signal, connected to, e.g. the flat sides of the pedals and inner side of the upper toe clips which sense and measure the pushing pressure being applied to the pedal in a downward motion and the pulling pressure from the pedal or against the toe clip in an upward motion and communicate signals representative thereof to the microprocessor-based unit(s). They also therefore sense the presence of the users feet on the pedals.

They function, work, communicate and may be provided in the same ways and means as described above for all devices and again can be by whatever sensory, output and communication means and can be integral, snap on, or attachable. They can be connected in whatever way to Pedals, Toe Clips and/or Clipless style pedals, such as those manufactured by Shimano and marketed under the SPD range, and measure the existence, timing and magnitude of the forces being applied through the pedals. They may be communicated to the external microprocessor-based unit and/or the internal microprocessor-based unit, which may code the signal.

These devices greatly benefit the technical training side of the system and can be used as a further measure/calibration system for the resistance setting. The main benefit however is that it therefore enables training the user in real world "spinning" techniques whereby the user pushes the pedals down and pulls them up again each time at high rpms, a technique well known to cyclists. The microprocessor-based unit(s) may make suggestions to the user as to their timings, to get their rhythm smooth, or as to the relative power of each leg. It also provides for further technique and freestyle simulation. On a fast but sharp turn the user may take his foot out/of the pedals to simulate putting his or her foot out around the corner. It can also therefore simulate the performance of tricks, jumps, etc where the user's feet come away from the pedals.

Foot Down Sensors

Further Control Input Devices are also disclosed by way of the "Foot Down" Sensors. These devices may be sensors, by whatever means providing a analogue or digital signal, e.g. floor pad pressure sensitive pads remotely connected to the unit which sense and measure the user putting their left or right foot down to the floor proximate to the unit and communicate signals representative thereof to the microprocessor-based unit(s). This is an example of a user-customised input, via array device.

They function, work, communicate and may be provided in the same ways and means as described above for all devices and again can be by whatever sensory, output and communication means. They can be connected in whatever way to the system, and measure the timing, existence and magnitude of the forces being applied by the user's feet on these sensors. They may be communicated to the external microprocessor- and/or the internal microprocessor, which may code the signal.

These devices greatly benefit the technical training and freestyle side of the system. The microprocessor-based unit (s) may make suggestions to the user as to their timings, to train the user in e.g. proper fast cornering techniques. On a fast but sharp turn the user may take his foot out/of the pedals to simulate putting his or her foot down around the corner. No prior art disclose anything like this system.

Hands Off Sensors

Further Control Input Devices are also disclosed by way of the "Hands Off" Sensors. These devices may be sensors, by whatever means providing a analogue or digital signal, e.g. pressure sensitive hand grips, perhaps also housing the HRM, mounted at the end of each side of the handlebars which sense and measure the user gripping the handlebar, i.e. hands on the bars, and communicate signals representative thereof to the microprocessor(s).

They function, work, communicate and may be provided in the same ways and means as described above for all devices and again can be by whatever sensory, output and communication means and can be integral, snap on, or attachable. They can be connected in whatever way to the system, and measure the timing, existence and magnitude of the forces being applied through the handlebar grips. They may be communicated to the external microprocessor-based unit and/or the internal microprocessor-based unit, which may code the signal.

These devices greatly benefit the technical training and freestyle side of the system. The microprocessor-based unit (s) may make suggestions to the user as to their timings, e.g. to prompt enhanced trick performance. It can therefore simulate the performance of tricks, jumps, etc where the user's hand(s) come away from the bars to perform a one-handed or no-handed trick. No prior art disclose anything like this system.

Gaming Input Devices

Whilst the active and control devices provide signals to the processor-based unit indicative of the normal movements of a user in performing an exercise to mimic a sport, it is envisaged that in at least one arrangement or more additional input devices may be provided. These additional inputs allow the user to provide signals to modify the program which are not a part of performing the exercise. They provide the interface for the fun/pure game controls but also for inputs unsafe to simulate (e.g. jumping the bike) and convert the users button presses into an input signal to be processed by the computer. They also provide for technique training in that the timing of the control will simulate actual times so as to enhance the user's knowledge of real world techniques and timing, even to learn freestyle techniques. They also enhance reaction times and therefore confidence for the real thing.

The Gaming Input devices cover the one or more user-button activated control inputs, providing the control inputs for the pure fun, standard controller and gaming side of the system which sense and measure pressure/inputs being applied thereto, by the user, and communicate a signal to the microprocessor-based unit(s) representative thereof. These are standard on any joystick or control pad, but are provided in my games controller, providing the control inputs for the pure fun, standard controller and gaming side of the system. They also provide for those inputs either not available in the embodiment/model owned by the user, in accordance with the modular nature of the system, or for those control inputs which may be too hard or unsafe to emulate. They may initiate a new "mode" of control inputs to actions, or provide a specific control for a specific action in the simulated world.

In one arrangement, again for apparatus including a cycle, one or more of the following signals may be produced by the gaming input devices provided. Each input device comprises a simple button with the function of each button being designated by software running on the microprocessor based unit. For different programmes the buttons may have different effects. My games controller provides for a plurality of Gaming input devices as may be required. In one embodiment, it provides for four such button type controls, which are, by way of example only, disclosed as controlling, by the software:

GAME 1—Jump Command—a basic or touch sensitive switch device—working through a button switch—switch mounted ergonomically within easy reach of user's hand into or beside the brake lever mounting clamps—activates a circuit to command the "rider" to jump the bike, length of press to release determines height (OR whatever control the software determines). Comes built in/to be retrofitted by user/ Snap On attachments.

GAME 2—Duck Command—a basic or touch sensitive switch device—working through a button switch—switch mounted ergonomically within easy reach of user's hand into or beside the brake lever mounting clamps—activates a circuit to command the "rider" to duck down, length of press to release determines duration (OR whatever control the software determines). Comes built in/to be retrofitted by user/ Snap On attachments.

GAME 3—Trick Command—a basic or touch sensitive switch device—working through a button switch—switch mounted ergonomically within easy reach of user's hand into the brake lever mounting clamps—activates a circuit to command the "rider" to perform a trick (OR whatever control the software determines). In Trick mode would be combined with the Control Input Devices to simulate the trick being desired. Comes built in/to be retrofitted by user/Snap On attachments.

GAME 4—EXTRA—a basic or touch sensitive switch device—working through a button switch—switch mounted ergonomically within easy reach of user's hand into the brake lever mounting clamps—activates a spare circuit. Can also be used to power Exercise Free Games—on the CycleSim as a pure games controller—for Cycling, Motorcycling, Flying, etc. Comes built in/to be retrofitted by user/Snap On attachments.

Plurality

Further such devices may be provided as may be required. One embodiment provides for two such EXTRA touch sensitive buttons on each side of the handlebars which may replace or augment the twist grips.

They come in all the forms, methods and means as per all devices as described above, again, they may provide analogue or digital signals as sensed by whatever sensory means, remote or integral to the equipment controller main body, communicated by whatever communication means and can be integral, snap on, attachable or basic, feeding directly or indirectly to the external and integral microprocessor-based units via the integral and industry standard electronics and may be integrated with the equipment or removably attached by whatever means. They represent input devices which detect a further range of inputs available to the user, which are designated the Gaming input controls, those a user may desire or may be required for Game Only use. They may be set within this upper body exerciser and simulator via integrated standard components in the handlebars, connected by cables to the handlebars or may be integrated into Handlebar Grip Covers and Housings, Seat Covers and Units and/or Basic Controllers.

The Gaming Input Devices may be simple analogue, digital or touch sensitive button control switches or may be thumbstick devices, wired into the appropriate location within the components of my games controller. They may be remote to main unit and the preferred embodiment of my games controller mounts them ergonomically, for easy use, within the housings surrounding the brake lever clamps. The user can therefore operate them with his/her thumb, which therefore leaves the fingers free to operate the levers. They may even be inputs controlled by the voice-recognition device as described later. The wiring from these controls is as per industry standard controllers' electronics. They may be connected integrally/snap on/by Velcro/etc means.

The Gaming Input Devices provide for further control of a simulated user through the simulated environment. The preferred embodiment provides for the common inputs as may be required by the software in controlling a cycle racing and freestyle based simulation game. This opens the Gaming and fun nature of the product to being able to control further aspects of the software being used. In conjunction with all other components they therefore provide for an extremely novel and complete control mechanism for any system, not just for use as a standard games controller but a significantly enhanced one. If the Active and Control Input Devices cover all movements in a 3D world, these may control shooting commands, looking commands, pick-up commands, control mode commands, etc in accordance with the software and as direct control or via an input/output mapping process within the integral microprocessor-based unit. They may also be controlled in terms of their output mapping/levels in accordance with a threshold function within the integral microprocessor-based unit, as discussed further later.

The example disclosed discusses Jump and Duck commands. It is envisaged that the Handlebars being lifted, or pushed, vertically up, or down may of course, control these inputs. The example disclosed is an embodiment with only three sets of handlebar control inputs, to therefore reduce the cost of the example disclosed. These commands are the software's interpretation of the control signal from the gaming input device. The "Jump" and "Duck" buttons are examples whereby the software reads this as a discrete control input, i.e. to perform a specific action. The "Trick" button may be such that it induces a complete new map of input/action commands. This therefore would double the range of control commands available to the user. Further Gaming Input Devices may also be connected, such as pressure sensitive sensors in the handgrips of the handlebars, which would be used in freestyle techniques to control the simulated rider taking either hand away from the bars.

EXTRA—Dual Purpose

The "EXTRA" button is of more significance as a discrete "Fire" button however, it is envisaged that these Gaming Input Devices may be in parallel, or series, with any other input device or that the integral microprocessor-based unit may map it to do so. For example, the Cadence signal may be wired through the industry standard electronics to the "X" button wiring of the Sony Playstation, which commonly controls a Fire or Accelerate function in many games. The "EXTRA" button here may be configured in parallel with the Cadence Input Device such that the user could simply press this button to input through this line. Microprocessor based unit(s) would be able to detect use of the "EXTRA" button to therefore detect "cheating". This would allow the users to take a break but still play the game. This may obviously however inhibit advancement to the next game/fitness level.

Plurality & Loom Array

The loom/array device provides for such a plurality of gaming input devices, as well as augmenting or providing for alternatives to control, active, system and simulation devices, to enable the user to connect any such connectable input or output device as they require.

Simulation Output Devices

As well as input devices, that provide inputs to the microprocessor based unit one or more output devices may be provided. The output devices may include one or more switches, activators or the like that provide for physical feedback from the programme running on the unit to the user to simulate events such as skids, knocks, falls, judders, etc. They provide the feedback mechanisms to help the user feel the effects of his techniques to help improve technique and to improve game involvement. They are mounted within the controller and/or on hinging mechanisms to help improve the realworld feel by providing greater forces around these pivots. They also cover automatic resistance tension setting and steering feel simulators. All may be controlled by the integral or external microprocessor.

The microprocessor-based unit may be further adapted to produce an output signal to an actuator or more than one actuator to control movement or other parameters of the exercise device responsive to the programme running on the unit.

For example, the output signal may be adapted to instruct the exercise device to increase resistance to the user performing a particular movement. In the case of an exercise bicycle, this may be to make it harder to pedal or easier to pedal depending on the programme that is running.

Alternatively, the output signal may operate an actuator which vibrates, thumps or knocks at least a part of the exercise cycle or other exercise device, for instance to simulate rough terrain or other obstacles. The display may, for instance, show that a simulated "bicycle" route includes rough terrain and move the actuators to simulate the feel of such rough terrain.

One or more of these devices may be connected to the exercise equipment, and/or around the handlebar and seat units, and are controlled by the microprocessor-based unit(s) to enhance the realism of the simulated experience and provide feedback to the user as a consequence of their inputs/actions in a tangible/tactile manner. This therefore provides for visual (via the display), aural (via the display's speakers) and tactile (via these devices) sensory stimulation to the user. The user provides the smell/taste.

These devices are actuators, i.e. motors, pulleys, twisters, thumpers, vibrators, gas cylinders, hydraulic or magnetic systems, or whatever actuating means which are fed a control signal by the microprocessor-based unit(s) either directly or via a coded signal from the microprocessor-based unit(s), read, "decoded" and by a De-Coder device (the "3D Shock Box") as discussed below. They may, of course, be controlled directly, being dependent on the microprocessors abilities.

De/Coder Device

This De-Coder device may be a simple microprocessor-based unit, or be within, or a function of the integral microprocessor-based unit, reading or sending analogue and/or digital "coded" signals between integral and external microprocessor-based units, or control signals to actuators, vibrators, etc. This "decodes" a single control signal into a plurality of further output control signals from this De-Coder unit to the actuators, vibrators, etc. This decoded signal instructs the De-Coder unit to activate, and/or deactivate, the appropriate outputs, at a certain frequency and magnitude or to a certain position. This De-Coder device may also function as a Coder input device taking a plurality of inputs and combining them by a Coding process into one coded input to the external microprocessor-based unit.

The power to these units may be fed from the microprocessor-based unit directly or may be boosted/powered internally by the system from its power source. They function, work, communicate and may be provided in this way and in the same ways and means as described above for all devices. Again, they can be by whatever sensory, output and communication means and can be integral, snap on, attachable or basic and may be integral or connected about the exercise device.

They provide added realism and enable physical feedback and control to the user/of the equipment by the microprocessor-based unit(s). This provides more distractions and motivations for the user, through the resistance adjustments and tactile sensations, and provides for greater involvement by the user having more inputs to process. Hills, winds, surfaces, jumping, etc and knocks, skids, judders, vibrations, damage etc can all be simulated in real time physically via these devices (i.e. the resistance adjusters and actuators respectively).

Tactile Simulation/Feedback—Shock Units

The "Shock" units (vibrators, thumpers, etc.) are the devices being actuators, i.e. motors, pulleys, twisters, thumpers, vibrators, gas cylinders, hydraulic systems, or whatever actuating means, etc., fitted to the exercise, handlebar or seat units, which actually move these units, knock them, vibrate them, etc to provide tactile sensations/feedback to the user.

They work as explained in detail above and come in all the forms, methods and means as per all input devices as also described above. Again, they may be controlled by analogue or digital signals communicated by whatever communication means, directly or indirectly by the microprocessor-based unit(s), and/or input devices (for example, the brake shock may be activated by the external microprocessor-based unit but may be turned off internally to the system by the brake being fully released). They can be remote or integral to the equipment or controller main body, and can be snap on, attachable or basic. It is also a preferred embodiment that these devices would be integral to the handlebar and seat units. It is also a preferred embodiment of my games controller that this system is modular in nature in that it can be retrospectively added to the system.

In one example it is envisaged that one or more of eight main modular simulation devices may be provided covering:

Front Handlebar Mounted—3D—Vibrators, Thumpers and Actuators,

Rear Seat Mounted—3D—Vibrators, Thumpers and Actuators,

Front Equipment Mounted—3D—Vibrators, Thumpers and Actuators,

Rear Equipment Mounted—3D—Vibrators, Thumpers and Actuators,

3D Shock* Front and 3D Shock* Rear—

Computer/console controlled devices in conjunction with a signal reader and converter system—working through vibrator motors and "Bell Type" thumpers which are fed a signal from the signal reader/converter system, console sends pulsed signal, unit reads and sends appropriate power to appropriate shock unit for appropriate duration or turning them on and off and changing magnitudes and frequencies—front self contained sub-control unit mounted onto handlebars and rear self contained unit mounted under the (optionally hinged) seat to provide greater force, both powered by system controller main body which is self powered by mains/battery—reads the signal(s) from the computer/console and converts the signal into separate signals to be sent to different vibrator/thumper units to emulate knocks/judders/etc around left/right side shocks, front/rear shocks, top/bottom shocks, and front/rear/left/right judder vibration shocks. Comes built in/to be retrofitted by user.

Front—3D Damage, Brake, Tyre & Surface Feel—Vibrators, Thumpers and Actuators,

Rear—3D Damage, Brake, Tyre & Surface Feel—Vibrators, Thumpers and Actuators,

Any other as may be required.

These output devices may comprise a controller controlled judder devices—working through vibrator motors which are fed one or more signals from either microprocessor based unit and/or reading appropriate power to front and rear brakes and sends appropriate power to appropriate shock unit for appropriate duration or turning them on and off and changing magnitudes and frequencies to emulate brake judder, damage and tyre/surface feel—front self contained unit mounted onto handlebars and rear self contained unit mounted under the (optionally hinged) seat to provide greater force, both powered by system controller main body which is self powered by mains/battery—reads the signal(s) from either microprocessor brake controls and copies the signal to appropriate vibrator units to emulate judders from braking. Also linked to an input device to relate signal to speed. Comes built in/to be retrofitted by user.

These simulations/feedback methods provide greater realism, enjoyment and interactive feedback from the microprocessor-based unit to the user to help them enhance their technical skills, providing a further means for the user to understand the consequences of their actions.

In terms of realism, for example, if braking too hard at the back wheel the rear brake shock may vibrate and/or judder to emulate a skid. The user may wish this to happen or my not and knows therefore to release the brake. As a further example, the simulated rider may be travelling over grass, very little sensations may be felt, then he/she move onto a rocky path, the front and rear tyre shocks may vibrate to emulate the bumpy surface conditions.

In terms of feedback to the user on technical issues, if the simulated world depicts a cyclist descending a steep hill, if the user's inputs were that they were still sat on the seat, leaning over the front of the bike and using the front brake only, the unit may vibrate the unit at the front to depict the front tyre skidding, if the user releases the brake it may stop vibrating but unless the user moves their weight over the back wheel by pulling back on the bars the display may depict a crash and the whole bicycle mat move, vibrate and thump. On screen suggestions may be made in a training mode to instruct the user. This will enrich the experience, providing for technical training and greater involvement.

Resistance Tension or Incline Adjusters—Exercise Equipment Simulation/Control—Resistance, Incline, etc Setting Adjuster(s)

Computer/console controlled device with a signal reader and converter system—working through, for example, motors and pulleys which are fed a signal from the signal reader/converter system, console sends pulsed signal, unit reads and sends appropriate power and signal to the unit which increases/decreases the tension setting on the flywheel pads—self contained unit mounted onto headtube/handlebar adapter powered by system controller main body which is self powered by mains/battery—reads the signal from the computer/console and converts the signal into a signal to a motorised tension controller which automatically adjusts the Exercise Bike's resistance tension setting on the flywheel pads to emulate going uphill, downhill, through soggy ground, etc. Comes built in/to be retrofitted by user/connected to existing device.

This simulation output device is a system, connected to the output of the microprocessor-based unit(s) that read signal(s) there-from, and adjust the resistance/exercise setting(s) of the exercise equipment in accordance with this signal. Primarily it may control the resistance setting on the equipment controlling how hard it is to pedal, row, run, step, etc but may also cover the inclination level of the equipment or whatever other exercise adjustment means may be relevant.

Resistance Setting Adjusters, Actuators or Communicators,

Incline Setting Adjusters, Actuators or Communicators,

Any other as may be required.

These may be or include motorised units being actuators, i.e. motors, pulleys, twisters, thumpers, vibrators, gas cylinders, hydraulic systems, magnetic mechanisms, or whatever actuating means (possibly simple connection to any existing automatic means), etc. They may be attached to the exercise device and actually move these units, otherwise control them to alter the resistance setting. They work as explained in detail above with reference to Simulation Output Devices overall and come in all the forms, methods and means as per all input devices as also described above. Again, they may be controlled by analogue or digital signals communicated by whatever communication means, directly or indirectly by the microprocessor-based unit(s) and/or input devices. They can be remote or integral to the equipment or controller main body, and can be snap on, electronic connector (and possibly communicator) or attachable. This may be by way of a connection to an existing manual or automatic device, a replacement of the existing manual or automatic device, communicate with the existing automatic device or be integrated into the equipment form new. It is a preferred embodiment of my games controller that this system is modular in nature in that it can be retrospectively added to the system.

This provides for further added realism in the system, for example, if the simulated world depicts going up a hill, the user will feel the increase in resistance through the exercise device automatically. It can simulate increases and decreases in resistance to exercise as a result of simulated hills, surfaces, winds, drafting, etc in the simulated world and as a result of the user changing the selected gears on a simulated bicycle. It also provides for the provision of a completely computer controlled, structured varied exertion training programme. This may provide resistances on a pure simulation basis, an exertion-adjustable simulation basis, a pure exertionary basis, or manually, all by the user's choice through the integral or external microprocessor-based unit's software. The exertion dependent control functions may be as a function of any or a culmination of the Active Input Devices' inputs in isolation or as against targets, as is discussed further under the "Threshold" section. Again, this is a key differentiator from the prior art in this regard as they are either uncontrollable or are part of a preset closed loop exertion controlled resistance system, generally responsive to heart rate or cadence only. As explained above, this restriction in the control of resistance settings prevents those with the ability and or desire to push harder from doing so.

It is implicit in the provision of such a versatile controller that the resistance-adjusting devices may be operated and controlled in any mode; Bespoke Game, Any Game, Game Free and Game Only mode, as they may be controllable by either microprocessor-based unit.

Steering Feel/Auto-Handlebar Resistance/Damping/RTZ Simulators

One or more additional output devices may be provided which vary the resistance to movement of the handlebar assembly, or brakes or seat, in response to signals produced by the microprocessor based unit. This may be used to simulate the effects of inertia on the system. It may work by reading the input signal from a speed and/or cadence sensor to calculate speed and from this generating a signal that is used to operate one or more motors which drive a weighted flywheel operatively connected to the handlebar, or brakes or seat, assembly to emulate the effects of the inertia of a real bike's wheels on the stiffness/action of the handlebars. Alternatively, one or more motors or actuators may simply adjust the tension of the springs/clamps/dampers/etc on the handlebar assembly hinging mechanisms or adjusting the length of the stems therein—self contained unit mounted onto handlebars/bottom of head tube (pivoting with left right control) or self contained units within the Control Input Devices hinging mechanisms, both powered by system controller main body which is self powered by mains/battery—reads the signal(s) from a speed sensor and copies the signal to appropriate motor units to emulate inertia effect/feel on controls. Comes built in/to be retrofitted by user.

These simulation output devices are a system connected to the output of the microprocessor-based unit(s) that read signal(s) there-from and adjusts the resistances to movement about the handlebar, brakes and seat mechanisms.

This may be provided by motorised flywheel devices within/connected to the handlebars or by automatically adjusting the resistance setting(s) of any one or more of the handlebar/seat pivot mechanisms in accordance with this signal. Primarily they adjust the speed of the flywheels or control the resistance, preload, compression and rebound damping setting(s), stem lengths or return to zero properties of these pivots, stems, sliders, etc, controlling how hard it is to turn, bank, lift, slide or lean the handlebars, brakes or seat.

Weight Forward/Backward (Pitch) Resistance/Damping/RTZ Adjusters,

Turn Left/Right (Steer) Resistance/Damping/RTZ Adjusters,

Weight Left/Right (Bank) Resistance/Damping/RTZ Adjusters,

Two Lever (Brake) Resistance/Damping/RTZ Adjusters,

Sidestep Left/Right Resistance/Damping/RTZ Adjusters,

Lift Up/Push Down Resistance/Damping/RTZ Adjusters,

Seat—Yaw Left/Right Resistance/Damping/RTZ Adjusters,

Seat—Lift Up/Push Down Resistance/Damping/RTZ Adjusters,

Any other as may be required, e.g. about the twist grip.

These may be or include units being actuators, i.e. motors, pulleys, twisters, thumpers, vibrators, gas cylinders, hydraulic systems, magnetic mechanisms, or whatever actuating means (possibly simple connection to any existing automatic means or through adjustment of stem lengths), etc. They may be attached to, connected to or form an integral part of these pivot units and/or the resistance and damping mechanisms connected thereto. They work as explained in detail above with reference to Simulation Output Devices. Again, they may be controlled by analogue or digital signals communicated by whatever communication means, directly or indirectly by the microprocessor-based unit(s) and/or input devices. It is a preferred embodiment of my games controller that this system is modular in nature in that it can be retrospectively added to the system.

This provides for further added realism in the system, for example, increasing the resistance settings as a function of speed to simulate the effects of inertia on a cycle or reducing the resistances if the simulated front wheel is in the air, even adjusting the return to zero properties. This is especially apparent in mountainbiking and motorcycling and the provision of such a feature within my games controller may add to the technical training enabled. Technical training in the principles of opposite lock steering, banking and "bum steering" methods, as are common in the motorcycling and mountainbiking worlds, is therefore enabled and simulated. They can also be used to simulate the effects of simulated damage to the cycle. They may also control the locking mechanisms as discussed above.

They also provide for the provision of a completely computer controlled, structured varied exertion training programme with respect to the upper body exercising virtues of my games controller. This may provide resistances on a pure simulation basis, an exertion-adjustable simulation basis, a pure exertionary basis, or manually, all by the user's choice through the integral or external microprocessor-based unit's software. The exertion dependent control functions may be as a function of any or a culmination of the Active Input Devices' inputs in isolation or as against targets, as is discussed further under the "Threshold" section. Again, this is a key differentiator from the prior art as none provide for computer controllable upper body exercise.

It is implicit in the provision of the integral microprocessor-based unit that the resistance-adjusting devices may be operated and controlled in any mode; Full Game, Any Game, Game Free and Game Only modes, as they may be controllable by either microprocessor-based unit. The resistance adjuster referred to above may be controlled by the external microprocessor-based unit while these resistance adjustment devices may be controlled wholly or partially internally by the integral microprocessor-based unit, maybe as a pure function of speed. It is also beneficial in Game Only mode whereby the resistances may be reduced to minimum levels for this purpose.

Fan—Wind Simulator

The apparatus may further include a fan that is controlled by the microprocessor based unit. The fan speed may be increased as the users speed increases to simulate the effect of wind upon the user.

The variable speed electric fan, connected to the output of the microprocessor-based unit(s), adjusts or controls the speed, and possibly direction (via actuators), of the fan in accordance with this signal.

The fan and actuators may be attached to, connected to or form an integral part of the system. They work as explained in detail above with reference to Simulation Output Devices. Again, they may be controlled by analogue or digital signals communicated by whatever communication means, directly or indirectly by the microprocessor-based unit(s) and/or input devices. It is a preferred embodiment of my games controller that this system is modular in nature in that it can be retrospectively added.

This provides for further added realism in the system, for example, increasing the fan speed as a function of speed to simulate the wind/user's simulated speed, as is one of the pleasures of real cycling. The user may sense the fan speed up and therefore be aware that the resistance may be about to increase also, automatically or through instruction and manual setting, due to cycling into a simulated headwind. This may be controlled on a pure simulation basis, an exertion-adjustable simulation basis, a pure exertionary basis, or manually, all by the user's choice through the integral or external microprocessor-based unit's software. The exertion dependent control functions may be as a function of any or a culmination of the Active Input Devices' inputs in isolation or as against targets, as is discussed further under the "Threshold" section. It provides for an exertion dependent cooling breeze or wind.

Again the fan may be controlled in any mode; Full Game, Any Game, Game Free and Game Only modes, as it is controllable by either microprocessor-based unit. The resistance adjusters referred to above may be controlled by the external microprocessor-based unit while this may be controlled wholly or partially internally by the integral microprocessor-based unit, maybe as a pure function of speed.

System Control Devices

In addition or in alternative to the Gaming Input Devices above, the input device may produce signals that are used to run the control side of the systems. They provide the interface for the purely digital control of the games and provide an interface to convert user control into an output signal to be processed by the computer.

The user may wish to lock the Control Input Devices and control the "rider" through these instead, therefore they can select control devices. NOTE—in the Snap On systems, the directional control buttons/joysticks ARE the Control Input Devices.

This group also includes the optional Readout Unit which gives normal digital readouts on speed, cadence, heart rate, on seat, time, elapsed time, etc. Further devices are also included, all these are discussed under the System Control Heading following.

System Input Devices

The System Input devices may be any one or more further button activated or joystick style control inputs, for the overall control of the microprocessor-based unit, controls and or software being used, which sense and measure pressure/inputs being applied thereto, by the user, and communicate a signal to the microprocessor-based unit(s) representative thereof as standard on any joystick or control pad, as provided in my games controller. They cover the control inputs for the overall control of microprocessor-based unit, controls and or software being used. They provide for the additional controls that may be required to enable full operation of the microprocessor-based unit(s) remotely from the handlebars or for control of different modes within the handlebar system, e.g. Start, and Pause (for overall control within a game), Up, Down, Left, Right, and Select (for selection control through option screens and menus), analogue, digital, (for control of input/output modes and internal settings). These control functionalities may be provided for both internal and external microprocessor-based units. They would essentially provide for all such commands as provided on the external microprocessor-based unit's original equipment controller and may even include a keyboard, pointer, mouse-pad or mouse.

The System Input Devices provide for the additional controls that may be required to enable full operation of the microprocessor-based unit(s) remotely from the handlebars or for control of different modes within the handlebar system. This provides for electronic option selection through different option screens, internally and externally from the remote position of the exercise equipment. They may be used to enter the personal information, preferences, passwords, etc of the user or changing views on screen, pausing the game and starting it, mapping inputs and outputs, etc. They may even be used as further Gaming Input Devices. The directional buttons may, as stated earlier, even be used instead of the handlebars, and vice versa, so that a user could play the game fully but without all the upper body exercise. This functionality and the provision of such system controls remotely are not provided in the prior art.

They come in all the forms, methods and means as per all devices as described above, again, they may provide analogue or digital signals as sensed by whatever sensory means, remote or integral to the equipment controller main body, communicated by whatever communication means and can be integral, snap on, attachable or basic, feeding directly or indirectly to the external and integral microprocessor-based units via the integral and industry standard electronics and may be integrated with the equipment or removably attached by whatever means. They may be communicated via the standard input/output lead or may be provided by way of a further, standard, connection lead or may be provided through the overall input/output lead which simply contains an additional standard lead for that device. A switch box may be further provided to enable the user to manually, or the computer to automatically, select their standard, e.g. keyboard, or that mounted on their exercise apparatus.

They may be set within this upper body exerciser and simulator via integrated standard components in the handlebars, connected by cables to the handlebars or may be input devices integrated into Handlebar Grip Covers and Housings, and/or Basic Snap On or Basic Controllers. In the simple Snap On and Basic systems, without the handlebar system, these system control devices may even be the control input devices as well.

The System Input Devices may be simple analogue, digital or touch sensitive button control switches and directional control devices, wired into the appropriate location within the components of my games controller. They may be remote to main unit and the preferred embodiment of my games controller mounts them within the housings surrounding the brake lever clamps and at the top of the system's stem. They may even be inputs controlled by the voice-recognition device as described later. The wiring from these controls is as per industry standard controllers' electronics. They may be connected integrally/snap on/by Velcro/etc means.

In one example there may be one or more of eight main input devices provided covering: four such joystick type controls and three such button type controls, which are, by way of example only, disclosed in the embodiment designed for control of a Sony Playstation.

Up, Down, Left, and Right Commands—

These input devices comprise basic switch devices, such as touch sensitive switches, or analogue movement direction rheostatic lever devices (Snap On Systems)—working through button switches OR analogue joystick type devices—switches/joystick mounted ergonomically within easy reach of user's hand into the brake lever mounting clamps—activate circuits to command the computer/console to move (an object/cursor) Up, Down, Left and Right (OR whatever control the software determines) (Digitally or via Analogue Signal). Analogue System can be switched to digital, also works so analogue for gaming/digital for menu screens. Comes built in/to be retrofitted by user/Snap On attachments.

Select Command

Pause/Start Command

Analogue System Control/LED—

Basic or touch sensitive switch devices—working through button switches—switches mounted ergonomically within easy reach of user's hand onto the top of the handlebar stem—activate circuits to command the computer/console to Start/Select/Pause (OR whatever control the software determines) AND to switch between handlebar, analogue, digital control (with setting readout LED). Comes built in/to be retrofitted by user/Snap On attachments.

These would satisfy all system control requirements for both the Playstation and the integral processor (via the integral display).

The present invention further provides for the following input devices as explained further below with regard to System Control Devices Keyboard Pointer Microphone Camera Graphical/Audio Overlay Input/Output Communications Input/Output System Control and Optional Devices The System Control devices are the components integrated into the handlebar system to primarily enable the system to operate in Any Game and Game Free modes, and further functionalities overall, as discussed further below.

They may be integral to the handlebar system and:
a Provide the means for reading and storage of programs and data.
Enable operation of the system as a stand alone interactive training system.
Measure signals and readings, set targets, and compare actual inputs against planned.
Process the multi-input-output threshold systems.
And programmable input/output relationships.
Provide the De-Coder system.
Instructing changes in resistances or control resistance controllers.
Display all information.
Voice recognition.
Produce sounds.
Image process.
Communicate with external microprocessor-based unit and memory means.

Readout Unit—Integral Power, Memory, Microprocessor-Based Unit, Display and Speaker Devices Display/Speaker Means Digital readout, and optional speakers, device—OPTIONAL—works through a microprocessor taking readings from the Active Input Devices coupled with an internal clock—mounted onto the handlebar stem—this gives normal digital readouts on speed, cadence, heart rate, on seat, time, elapsed time, average speed, Max Min Heart Controls, etc. as per normal exercise machines.

The display and speakers may be an integral part of or be attachable to the handlebar system or exercise device to display all information from the internal clock, microprocessor-based unit, inputs and memory. This may include readouts for target and actual times, speeds, rpms, heart rates, seat statuses, resistances, etc (and may even provide for handlebar movement target and actual indicators) textually and/or graphically. It may include general text/numerical display means also to enable system control. It may also depict a training program histogram depicting the target input readings graphically over time which may also include a representation of the user's progression along this program and that of a simulated opponent, representing the graphical depiction of cumulative and/or current exertion/success levels as against that required.

The display may be in whatever form, LEDs, LCD, CRTs, handheld units, etc. The integral microprocessor-based unit measures the input signals and reads the memory, calculates the required information there-from and displays it through the display and speaker means.

An optional device will contain a connection to the console's memory card unit which will replicate the memory card slot but within the controller main body. This will also function as a control unit for Game Free training whereby the user's current fitness/game level's settings are stored in the memory card. This will store the current level's resistance tension settings, seating commands, required speeds and cadence and enable the Exercise Bike to be run stand alone as a pure automated trainer but with the game's training level progression. This memory may also, additionally or alternatively, be fully integral.

Also optional may be a complete heart rate monitor system which may be built in to the readout unit. This will store the user's critical information providing for proper zone training, giving accurate calorie counts, fitness indices, etc. Again to provide for game free training also.

The controller may include a microprocessor and thus form a complete integrated system. No other external microprocessor based unit will then be required and signals from the input devices may be passed to this integral microprocessor.

These devices may come in any available form, may be remote or integral to the equipment controller main body, communicated by whatever communication means and can be integral, modular, snap on, or attachable by whatever means. The system of all input and output devices may be integrated with these System Control devices, i.e. Input and Output Devices' signals may be direct through to/from an external microprocessor-based unit but copied to the internal microprocessor-based unit, or the signals from the input/to the output devices may be via the integral microprocessor-based unit to/from the external microprocessor-based unit.

The integral microprocessor-based unit, with integral clock, is connected to all the inputs, outputs, memory and display and may have it's own power source and back up batteries. This enables the Game Free and Any Game modes of operation. They also provide for the standard readouts as given by any computer controlled exercise apparatus. There is no benefit in exploring further the mechanisms of the microprocessor-based unit, memory means and display means as they are well known to those knowledgeable in the art.

Memory Means—Multi Functionality

The memory may be fully integral or simply a remote connection of a standard memory card, as used in many games consoles, to the internal and external microprocessor-based units or a direct communication line with the external microprocessor-based unit's memory.

It may store actual program code, settings data, historic data, training program data, or whatever information is relevant to the embodiment in terms of the User, the Equipment and the Game/Training Program.

User information may include their age, sex, weight, height, blood pressure, heart rate zones, fitness level, activity level, preferences, training diary, etc. The Equipment information may include the type of equipment, the features present, the calibration settings, the resistance adjustment control method, etc. The Game/Training information may store the current "game" position and "high scores" (in the same way as current games consoles and computers do) and or it may include a full or certain future training program routines or methods to enable the user to still set or work their way through their training program with or without the external microprocessor-based unit. Obviously less information is needed as the external microprocessor-based unit and display may be used to cost-effectively provide the powerful graphic and aural stimulation, control the tactile stimulation and run the full simulation.

The integral memory may hold the training program in terms of training maps; the achieved/required speeds, rpms, resistances, zones, seating positions, etc. over time past, present or future.

The integral and external memory means may further be able to synchronise with each other through communication and synchronisation programs written into the microprocessor-based units' memory and software, or simply via common password mechanisms.

Power Means

The integral systems may have their own power source and back up batteries. In simpler embodiments this may be provided via the external microprocessor. Internal power enables full stand alone functionality and also provides for greater power to be provided to the Resistance Controllers, Incline Controllers, Actuators, Vibrators, Thumpers, etc.

Multi Modal Operability

One of the main features and benefits of my games controller is that it can be used in a variety of ways. It may be used to run bespoke exercise or simulation software (Bespoke Exercise/Gaming) or it can be used to play any other games (Any Game & Train), whereby the users exertions may be combined to power the accelerator or fire commands of that game. Further, it can be purely used as a state of the art games controller (Game Only), as per the first aspect overall. It is the input/output structure of my games controller, along with the internal microprocessor-based unit for additional features, which makes these options possible. These are discussed further in accordance with the third aspect.

Pure Game Play Functionality—Game Only Mode

In accordance with the first aspect, the game only functionality of my games controller is provided by my controller being a I/O controller in its most basic form, as described fully earlier. It also provides for better value for money due to this multi functionality. In this mode the system is a pure games controller that has the benefit of real input mechanisms, like the steering wheel type controllers available for most platforms, and a stable base, unlike most games controllers. This also provides for exercise free training at the technical side of the cycle game. In the embodiment disclosed in the drawings, the EXTRA analogue/digital or touch sensitive button may be readily used for game only mode. This would, for example, take the cadence or speed circuit, or whatever circuit it is configured to, and gives this circuit full manual control through this button which would commonly be or be set up to be the accelerator/fire/etc. button, without needing the user to exercise.

Stand Alone Equipment Upgrade Functionality—Game Free Mode

The above devices in combination and in conjunction with exercise apparatus, Active and System Input Devices and Simulation Output Devices, and possibly without the Control and Gaming Inputs and external microprocessor-based unit, provide an upgrade; transforming any piece of exercise apparatus into an interactive, computer controlled, monitored and audited; programmable piece of apparatus. With the added feature of the Handlebar System they provide an upper body exerciser too.

The integral microprocessor can read, from the memory, a training program in terms of training maps; the achieved/required speeds, rpms, resistances, zones, seating positions, etc. over time past, present or future and depict the required levels to the user. This may even cover required movements of the handlebars as part of a structured upper body exercise routine. In essence it provides all the exercise functionality of the fully integrated system, i.e. in the embodiment as connected to an external microprocessor-based unit, by without the video, audio and shock feedback.

Input/Output Mapping

The above devices in combination and their links to all the input and output devices in my games controller can control the input/output mapping/setting of the devices within the system, with reference to their control lines into or out of the external microprocessor-based unit and or their outputs' control. This can be individually or with reference to a plurality of signals from any one or more inputs, maybe according to comparison against target input levels, frequencies, rates, statuses, etc.

Any Game Exercise Functionality

In Any Game Exercise mode the system provides all the pure joystick functionality, through the Control, Gaming, System Input and Shock Simulation Output Devices, but where the inputs may be controlled through a user configurable system which compares actual active input readings with a target reading training map (saved in the integral memory, processed by the integral microprocessor-based unit and displayed by the integral or external display (over or on a portion of the screen)) and outputs a user configurable output through whatever control line(s) it is configured to control or limits the maximum input levels of whatever control line(s) it is configured to limit, which is wholly representative of the current achievement of actual inputs as against target, individually and/or in plurality cumulatively and maybe over-ridable by certain input(s), as referred to above. They system may provide warning systems through the integral display and speakers, or via the graphical/aural overlay device, indicative of whether the user is behind targets, on targets (within acceptable range) or too far ahead of targets, exercising too much.

For example, if the game is a car racing game, the accelerator may be selected by simply pushing one button on a standard controller. If we are running this game, our system will compare actual inputs to the target and will output a static signal (i.e. accelerator full on) if we achieve all these inputs or a percentage on/off signal representative of our cumulative achievement of all targets. The signals may be set up by the user to e.g. "stop accelerating" if any one of the inputs is not performed, e.g. cadence, so as to give full control. If the game is a shooting game, full achievement of all target inputs may control an "Autofire" command and again, e.g., not pedaling, no cadence, may stop all firing.

Voice Recognition

The voice recognition feature of my games controller works via an internal microphone, which may communicate with either microprocessor-based unit, which stores the software to perform the recognition and control functions. This device may provide analogue or digital signals as sensed by whatever sensory means, remote or integral to the equipment or controller main body, communicated by whatever communication means, feeding directly or indirectly to either the external and integral microprocessor-based units via direct integral or additional connections with industry standard electronics and software. It may be integrated with the equipment or removably attached by whatever means.

This may be used to automatically load the appropriate user's settings, history, data, etc (i.e. User, Equipment and Game Data) and may be used as a non-tactile method of controlling the input devices Microphone The internal microphone, which may communicate with either microprocessor-based unit, picks up sounds generated by the user. This device may provide analogue or digital signals as sensed by whatever sensory means, remote or integral to the equipment or controller main body, communicated by whatever communication means, feeding directly or indirectly to either the external and integral microprocessor-based units via direct integral or additional connections with industry standard electronics and software. It may be integrated with the equipment or removably attached by whatever means.

This may be used to enable voice communications, voice-sampling, etc. of most benefit on remote multiplayer modes. Different users may then communicate aurally with each other and they may be able to hear the levels of exertion of their opponent. This also helps provide further social benefits of using the system, akin to being at a gym and may be in conjunction with the Video Device as follows.

Video Camera

The controller may further include a video camera which is adapted to take pictures of the user and transmit the images to the microprocessor based unit. The camera may comprise a CCD device and may be mounted onto either the handlebar or the support.

The provision of the camera may be used to transmit images of the user from one microprocessor based unit to another, for example over the internet. These pictures may then be displayed on a screen so that users can see other users. It is envisaged that this will be especially useful in allowing users to compete against each other using interlinked microprocessor based units whilst seeing the images of the other user.

The provision of a Video Camera/Web Cam device with my games controller works via an integrated or attached industry standard Web Camera which takes digital video footage, which may communicate with either microprocessor-based unit which stores the software to use the images. The data from the camera may be communicated by whatever communication means, feeding directly or indirectly to either the external and integral microprocessor-based units via direct integral or additional connections with industry standard electronics and software. It may be integrated with the equipment or removably attached by whatever means.

This may be used to sample the face of the user to enable graphical overlay of the user's real face onto that of the simulated rider. It enables live pictures of the user to be communicated through the microprocessor-based unit(s) across whatever network of computers the system is connected to. This will enhance the interactivity, personalisation and social virtues of the system. The user may be abroad on holiday or business and could still train with his colleagues at home or in the gym and see each other via the web cam and talk to each other via the microphone, and internal or external speakers.

Graphical/Audio Overlay Input or Output

It is further envisaged that my controller may have audio and visual input and or output devices, receiving signals from an external CD player, TV arial, Video, or whatever or sending signals thereto. The integral microprocessor may further accordingly provide audio/visual overlay features whereby it can overlay the input signal its display and/or speakers or the external display/speakers. It may also provide Overlay output whereby it simply overlays graphical and audible signals over that on the users TV, etc.

Keyboard and Pointer

The controller may further provide a keyboard and or a pointer (mouse, trackball, pads, etc).

Communication

Finally, providing an integral modem and/or connection to a mobile phone or standard line, may enable use of the system in Game Free mode over the internet or networked in this way.

Peripheral Connections

These above devices may be communicated through the controllers output connector through the same lines or through additional wiring with multiple connectors at the end connecting, for example, to the game controller, microphone, a USB, keyboard and mouse inputs on a PC. A "Double Adaptor" may then be provided at each of these to enable the standard devices for that computer to be used as normal. A manual or automatic switch may be provided which controls which devices may be used, ie the computers normal device or the remote one proximal to the exercise unit.

Overall—all Devices, how? What?

What

The input pick-ups detect the required activity and the output devices control the required activity, by connection to the controller, exercise apparatus and the user, producing analogue or digital signals, and may be integral or remotely connected through industry standard, or whatever means, representing the replacement of standard joystick, steering wheel, or button type input devices, as per an industry standard controller, with the appropriate pick-ups and control devices as disclosed herein.

How

All inputs can provide analogue, touch sensitive or digital signals by mechanical, biosensor or whatever means; switches, button switches, touch sensitive button type controls, potentiometers, photosensitive optical-interrupter circuits, magnetic induction detectors, magnet and reed switches, variable voltage generators, thermoresistors or piezo-electric pressure sensitive transducers or any other type of sensor input means. They may also be provided by connecting or communicating with existing sensory or control means. Outputs are discussed further below.

With regard to the heart rate monitor system and inputs they are by industry standard means for these devices, generally by Ear Clip, Chest Band or Hand Grip means which sense the heart rate of the user by these, or whatever, means and communicate this to a reading device, by whatever means, e.g. cable hard wiring, IR, Radio, etc. This may be a direct signal or via the "De-Coder".

The communication methods, between the remote input and output devices and the controller main body may be by whatever means, such as cable hard wiring, IR, Radio, etc means.

Electronics

It should be understood that the internal electronics from the input sensors or control devices to the external microprocessor-based unit are as per the industry standard electronics, appropriate for the specific computer or console, or configurable internally with different output connector adaptors. This is not discussed further as it is well known to those knowledgeable in the art and would be designed/configurable to be appropriate to any such microprocessor-based unit past, present or future.

Configurations

It should also be understood that a key feature of my games controller is that all signals can have direct connection, through the standard internal electronics of such controllers, to the external microprocessor-based unit, and/or may be also "copied" through to the internal microprocessor-based unit also and/or may be controlled/connected via the internal microprocessor-based unit.

The internal microprocessor-based unit will use these readings for it's integral display and it may be used to override the direct connection to allow for a control input/output signal to output/input signal mapping system which can set the user's devices to use or control whatever, line(s) the user decides. It may also be used for a threshold-mapping system to take the signals from any one or a plurality of input signals and combine them and or compare them to a certain target map to produce a certain output along certain control line(s) or limiting output from certain control line(s), as discussed in Any Game Mode further. The internal microprocessor-based unit may also provide the De-Coder device transforming multiple inputs or single coded outputs, via coded signals, into single coded inputs or pluralities of outputs.

Physical Forms

The basic principle is the provision of the removably attachable header unit controller main body, which generally houses the Control, Gaming and System input devices with looms and plugs connecting to the remote inputs, connected to the equipment and user of the Active input devices. All components may of course be integrated into the equipment from new, or may be retrospectively fitted, by these example methods:

Via the bars and bracket system to the equipment with Snap On mountings, Velcro, Tie Lock, or whatever means to connect the Active sensors to the equipment.

Via handlebar grip covers and housings with Snap On mountings, Velcro, Tie Lock, or whatever means to connect the Active sensors to the equipment.

Via a basic analogue/digital controller and mounting bracket with active input plugs and with Snap On mountings, Velcro, Tie Lock, or whatever means to connect the Active sensors to the equipment.

These options may be applicable to any of the different device types, not just the Active sensors, but e.g. for the Seat Control input devices and Simulation Output Devices too. All controllers may feature a quick release mechanism within their connections to the equipment, i.e. relating to the Bars, Seat and Active pick-ups and cabling—all other may be internal to the controller/seat.

Overall—Method

The User Manipulates the:
　Exercise device,
　Steer, weight, lift, seat and brake, control input devices, and
　Gaming and system input devices, While his or her body passively activate the active input devices through the HRM system and the exercise device active pick-ups.

The Computer Monitors the:
Active,
Control,
Gaming, and
System input devices.

The Computer and Software
Measure/Process the inputs, in accordance with the software, "looking" for specific inputs, repeated inputs, combinations of inputs together or in sequences, etc and determines user's simulated position, velocities, accelerations, spins, forces, etc in accordance with all input signals and a virtual simulation engine and a 3D simulated world consisting of virtual roads, objects, events, worlds, etc., i.e. an environment of competitors, obstacles and opportunities for advancement/relegation in a gaming metaphor. The software uses 3D graphics, sound and trade secret movement sensor algorithms and engines where not just the user's physical activity provides advantages but the user's technical skills with the steering/weight/lift/controls and brakes and seat also.

The Computer Outputs
Sound and video through the display and speakers, simulating a route.
Interactive simulation and feedback, controlling the exercise device, the control devices and the Shocks.

In Game Only Mode
The system provides pure joystick functionality whereby, as described further above, the Extra button, or a Twist Grip, may be a switch in parallel with the pedaling speed or cadence circuit which is wired through the common "Fire" button of the particular system or is configured to do so.

In any Game Mode
The system provides all the pure joystick functionality but where the Extra button may not be used but is controlled through a user configurable system which compares actual active input readings with a target reading training map (loaded to the integral memory, processed by the integral microprocessor-based unit and displayed by the integral or external display (over or on a portion of the screen)) and outputs a user configurable output through this common "Fire" button, or whatever control line(s) it is configured to control/limit, which is wholly representative of the achievement of actual inputs as against target, individually and/or in plurality, as referred to above.

The training map consists of the target levels/signals that should be received from the active input devices mapped over a time period, i.e. what resistance setting, speed, cadence, seating position, pedal pressures, heart rates, etc should be exerted by the user over different time periods, varying over the whole time period in accordance with a structured training program, stored in the integral memory from an integral program or downloaded from external. The resistance setting level may be as a required input or an output to therefore automatically adjust the resistance of the exercise device. This training program may be stored wholly on the internal memory and/or be loaded to the internal memory each time the system is connected, to the external microprocessor-based unit, and software therein. The internal system may communicate with the external system to download the results and data of the last training session(s) or this may be by password mechanisms.

In Game Free Mode
The integral memory will have a training map as referred to above loaded internally and will perform all the calculations as referred to above but the system is being operated in totally stand alone mode. Everything runs as per the Any Game mode except that the handlebars may be locked as no control or game input devices may be "effective", only the system input devices remain functional to control the integral microprocessor-based unit of the system. The map may however also depict certain upper body exercises to be performed in this mode too, therefore including a map of handlebar, seat, etc movements also. The internal microprocessor can then perform the same calculations as referred to in Any Game mode but instead of outputting a signal representative of this the display will depict how far ahead or behind the user is against target cumulative and current exertion and input levels individually and/or in plurality.

According to a third aspect, the invention provides a programme carrying device such as a programme cartridge which is adapted to store programme instructions which when operated on a microprocessor unit produce apparatus in accordance with the first aspect of the invention.

The programme may be adapted to stimulate a sports activity such as running, cycling, rowing etc. on a display. The user interacts with the programme through the input device.

One of the main features and benefits of my games controller is that it can be used in a variety of ways. It may be used to run bespoke exercise or simulation software (Bespoke Exercise/Gaming) or it can be used to play any other games (Any Game & Train), whereby the users exertions may be combined to power the accelerator or fire commands of that game. Further, it can be purely used as a state of the art games controller (Game Only), as per the first aspect overall. It is the input/output structure of my games controller, along with the internal microprocessor-based unit for additional features, which makes these options possible.

Game Only
The game only functionality of my games controller is provided by my controller being a I/O controller in its most basic form, as described fully earlier. As childhood obesity is such a problem, this mode provides a unique opportunity for parents to demonstrate and for children to get used to and enjoy the system so that it may encourage full use with exercise. It also provides for better value for money due to this multi functionality. In this mode the system is a pure games controller that has the benefit of real input mechanisms, like the steering wheel type controllers available for most platforms, and a stable base, unlike most games controllers. This provides for exercise free training at the technical side of the cycle game.

In the embodiment disclosed in the drawings, the EXTRA analogue/digital or touch sensitive button may be readily used for game only mode. This would, for example, take the cadence or speed circuit, or whatever circuit it is configured to, and gives this circuit full manual control through this button which would commonly be or be set up to be the accelerator/fire/etc. button, without needing the user to exercise. It is also disclosed that this may be attachably replaced or complemented with a twist grip as detailed above which would give added functionality by more accurate analogue accelerator control, especially those depicting motorcycle, jet ski, skidoo, etc racing.

Bespoke Exercise/Gaming
Structured training programmes can be structured through the software in the form of different game levels as per a standard game and played through the normal methods of game progression, whereby progression to further levels is only possible of successful completion of all preceding levels. The user may start very basic level, which may be structured as a very basic exercise routine applicable for those who have not exercised in a long period of time. The display will depict a basic course for the users to successfully negotiate and an opponent for the user to beat. The user will only be able to progress by successfully beating this simulated opponent, who will also act as a tour guide and a pacesetter.

This ensures that people do not go straight into an exercise routine above their level of fitness and the structure will progress through harder levels, including greater resistances, durations, technical stages, etc in accordance with a professionally structured training program, potentially adjusted for the user's objectives, age, sex, etc which are entered before commencing. This provides greater challenges, and therefore satisfaction on completion, for users rather than the prior arts' heart rate zone only style training which really only represents a pure exercise routine with interactive controls for distractionary purposes.

During the program the system may be set up to purely monitor the users heart rate for data and monitoring purposes and/or may be linked to a program and/or system warning, shut down or pause routine if the heart rate exceeds safe limits and/or may vary the exercise programme with regard to the user's heart rate. The software may be written so as to provide aural and/or written instructions and encouragement to the user. The software may also be written so as to drop the user back a number of levels if the user has not exercised on the apparatus for a period of time.

As discussed, the software and HRM may run an initial grading and classification programme to estimate the fitness level of the user in accordance with their profile, as input by the user. This programme then adjusts the intensities and durations of the courses and speed of personal trainer "opponents" to set customised realistic goals and milestones.

The training programme includes such an algorithm which uses this fitness level as a base for the structure of each game level. Many different courses may be provided with the software. These courses may be divided up into sections, perhaps of different, maybe increasing, technical or exertive requirements or may be any course simply divided into sections. This is common on many games for "Section Times". In accordance with the user's preferences, training history, fitness level index, etc and in accordance with the generally accepted training principles, the algorithm includes a progressive exercise feature. This sets the users required physical exertions over each exercise session to provide a level of such duration, length and intensities as to represent a personalised training programme for the user. The algorithm then sets a course of such durations and intensities and also sets the required completion times and or pace of opponents.

This therefore sets out a target set of readings that should be input by the user over the course, ie what cadences and/or speeds, seating positions, resistance settings (to be received or control) and any other readings as may be required, should the user perform to ensure they can progress (in fitness terms). Only on successful completion of the course does the user progress to the next "game" (i.e. fitness) level. On top of this will be the normal gaming requirements whereby the user must successfully navigate the course. If the user goes off the course they will be slowed down which may inhibit them from completing the course in the required time, gameplay advancement. The algorithm has a feature whereby it drops the user back in fitness level as a function of the time since the last training session was performed. The algorithm may also provide such a static, warm up or warm down routine within which it may further perform a fitness grading to provide real time fitness assessment. This may be based on a heart rate recovery or resting heart rate basis.

The simulated course may be designed so as to ensure the successful negotiation thereof will require a certain number of repetitions of twists, pulls, leans, etc and stretches of the upper body to control the handlebar system and therefore provide for a structured and progressive upper body strength and flexibility training program also.

The Processor may provide a trainer, competitor rider, or icon in the integral system, who may stay just ahead to entice/motivate the user and be a tour guide but mainly sets the pace in accordance with the training program, which may be to keep the user in the target heart rate zone or be a straight forward challenge whereby the competitor's pace is set for the user to beat to enable fitness and game level progression, as discussed earlier. They also therefore have the motivational benefits of a leader, a class and the safety factor of constant heart rate monitoring.

Users will have the customised set training program for them to complete which they know is structured and approved by those qualified to do so, not therefore progressing at what they think their pace should be and not also limited to within certain heart rate zones, etc. This is in the easy to understand guise of a video-game race. Users need not be fitness experts. Their training sessions are updated in real time professionally. Combining this customised physical training plan with such a complete control, exercise and gaming device gives the user the perception that each goal was achieved through both physical and mental effort. Each session has a target, winning. The user is being pushed to the line for each goal providing an unprecedented and magnified sense of achievement for each and every exercise session. This creates, for the first time in the fitness industry, a real time motivation and a thirst for more, addiction coming through the buzz of accomplishment. Not just is aerobic ability being improved, but strength, flexibility and physical and mental agility too.

The software may also be written to display prompts to the user, and/or video sequences, with instructions, of non-machine warm up exercises and stretches, etc to perform before attempting the level and the required warm down exercises and stretches also. It may also display prompts and/or video sequences, with instructions, of specific handlebar/seat exercises as bespoke strength and flexibility training.

The user may be required to enter that they have properly performed these exercises and the software may only allow this after the required time to complete these has elapsed so that the user cannot simply say, "OK". Software may also be written which displays the strength/flexibility exercise to be performed on the unit's bars, seat, etc and may use the readings from these devices to measure performance of these exercises, comparing progression, etc and perhaps depicting a simulated weight lifting competition or strength training class.

In a manually controlled resistance embodiment of my games controller, the Resistance Setting Reader device as described above will enable the system to audit the proper adjustment of resistance by the user to allow progression by strict training requirements. This may be used by the computer to note a failure or by it affecting the possibility of progression by changing simulated gears, therefore adjusting the speed, of the simulated user in the simulated world. For example, if the display instructs the user to increase resistance for the depicted approaching hill, if the user does so, the speed of the simulated user will be the purely dependent on their continued speed/cadence; if the user does not increase the resistance, the speed of the simulated user will be decreased to offset this failure, simulating that the user selected a lower gear on the simulated bicycle to ascend the hill. Obviously lower speed may prevent the user from completing the level, beating the opponent and advancing.

As discussed earlier, the user may chose to exercise in zone training mode, whereby the program responds to their heart rate. The advantage of my games controller is that it does not make this mandatory nor preset and it provides for enhanced measurement of personal zones by the system rather than the inexperienced user.

To satisfy a wide range of exercisers and to make for broad ranges of experiences the current system provides for the software to be developed providing different software for different activities, general disks with option screens to set u the user, equipment and game level profiles or "drive through options" on the display, this may be the warm up.

Game Free or Any Game and Exercise

The controller may further provide internally integrated inputs and a combination of internal microprocessor-based unit, memory and display as well as all being linked to the external microprocessor-based unit. Including its own memory, microprocessor-based unit and display and speaker means allows for use of the interactive system, not only as an input/output controller for a computer/games console, but also as a stand alone interactive exercise computer. It is also provided to enable an enhanced Any Game mode of training whereby the user exercises as per their training programme but while playing any game whatsoever. In this mode the users training session requirements, and achievement levels thereof, may be used to govern the systems inputs or input levels to the external microprocessor, sending a signal along a preset/user selected output line, or limiting levels available, representative of the level of achievement of any one or more or all exercise readings as against target.

Game Free Exercise

The integral microprocessor can read, from the memory, a training program in terms of training maps; the achieved/required speeds, rpms, resistances, zones, seating positions, etc. over time past, present or future and depict the required levels to the user. This may even cover required movements of the handlebars as part of a structured upper body exercise routine. In essence it provides all the exercise functionality of the fully integrated system, i.e. in the embodiment as connected to an external microprocessor, but without the video, audio and shock feedback.

The internal memory may be the only memory available where the user is using the system in Game Free mode to upgrade their exercise equipment to being a computer controlled and monitored piece of exercise equipment. The inbuilt training programs may be provided by the inbuilt memory and/or memory cards attachable to the systems circuitry, read by the integral microprocessor-based unit, and displayed/sounded as targets or controlled as settings, which then reads the Input Devices, calculates actual performance, compares this to actual performance, calculates current and cumulative variances, and displays this to the user. This session can therefore be in accordance and under progression of their personal programme.

In this embodiment, the user will not need the full computing power to display magical graphics and sounds, but only to store in memory the current, and possibly future and past, training programs and data, in terms of the required/achieved input levels from the input devices mapped over the training program's duration, in terms of their application and/or levels of exertions and possibly the resistance settings of the equipment. The internal microprocessor-based unit can therefore control and audit the training program as a stand-alone system and can link to the external microprocessor-based unit and update this data and/or download data.

This can be easily achieved with current microprocessor-based units cost effectively as the integrated system is purely an exercise computer, signalling the user as to target inputs and comparing the users actual exertions to these targets, if the user wants the full graphics/sound and controllability they simply connect up to their computer/games console. None of the prior art has this ability as they are all either a complete integrated interactive exercise system which has an integral bespoke computer system performing all exercise computing and the graphics, sound, etc or they are simply a link to an external computer, generally via an internal threshold device.

This is of considerable benefit to the user as it essentially converts any exercise bicycle or stationary bicycle coupled with a turbo trainer to a fully integrated, computer-controlled and monitored exercise bicycle/trainer; giving all the benefits of the programmability, memory, structured training and monitoring to such equipment along with the added functionality of it being connectable to any external computer to train along with full interactive video and sound and the means for technical training. This provides for those times the user may wish to simply watch TV or a video, for instance, while exercising, but still through their programme.

Input/Output Mapping

The above devices in combination and their links to all the input and output devices in my games controller can control the input/output mapping/setting of the devices within the system, with reference to their control lines into or out of the external microprocessor-based unit and or their outputs' control. This can be individually or with reference to a plurality of signals from any one or more inputs, maybe according to comparison against target input levels, frequencies, rates, statuses, etc.

Any Game Exercise

Further provided by the internal microprocessor and supporting means is the option to train through the user's current training program but while playing some other game. In Any Game Exercise mode the system provides all the pure joystick functionality, through the Control, Gaming, System Input and Shock Simulation Output Devices, but where the inputs may be controlled through a user configurable system which compares actual active input readings with a target reading training map (saved in the integral memory, processed by the integral microprocessor-based unit and displayed by the integral or external display (over or on a portion of the screen)) and outputs a user configurable output through whatever control line(s) it is configured to control or limits the maximum input levels of whatever control line(s) it is configured to limit, which is wholly representative of the current achievement of actual inputs as against target, individually and/or in plurality cumulatively and maybe over-ridable by certain input(s), as referred to above.

The integral memory of my games controller stores all the user and equipment's settings, preferences, etc but also stores the full or next level(s) they must complete in terms of a training map for each of the required inputs—e.g., speed, cadence, resistance, heart rate, on seat, etc. Here we are totally focused on using the exercise equipment to power the vehicle/character/guns or whatever (perhaps steering ability) of whatever game we choose to play.

The control, system and game functions of my games controller will all operate as normal directional controls/buttons, etc in accordance with a preset or user definable input/output relationship. The integral microprocessor-based unit will read the memory and will display the required exertion/activity levels for the user and an integral sounder may warn of changes. This may be done via the graphical/aural overlay system.

The training map consists of the target levels/signals that should be received from the active input devices mapped over a time period, i.e. what resistance settings, speeds, cadences, seating positions, pedal pressures, heart rates, etc should be exerted by the user over different time periods, varying over the whole time period in accordance with a structured training program. This is discussed further above. This training program may be stored wholly on the internal memory and/or be loaded to the internal memory each time the system is connected to the external microprocessor-based unit, and software therein. The resistance setting level may be as a required input or an integral output to therefore automatically adjust the resistance of the exercise device. The internal system may communicate with the external system to download the results of the last training session or this may be by password mechanisms.

The microprocessor-based unit will read the signals from all the active input devices and will compare actual to target. The microprocessor-based unit will then output a signal along a preset/user selected output line, or limit such signal levels available, representative of the level of achievement of any one or more or all.

This enables use of the device to control any game what so ever but while still training through the user's set training program where the user's attainment against targets affects their ability to control that game in a user configurable representative manner, specifically allowing input signals proportionate to the proportionate achievement of targets.

As an example, if using the controller in Any Game Exercise mode for use with any motorbike game, the steering, brakes, etc would function from the Control Input Devices, the Gear Selector may be used to control simulated gears but the throttle input to the game may be controlled by a threshold device, a program running in the integral microprocessor-based unit. This threshold device will only give full throttle to the throttle control line if the user is exercising at the appropriate speed and cadence, within the appropriate zone, in the appropriate resistance setting and seating position measured in real-time as against the stored target per the training program. It may culminate the percentage attainment of these targets together wholly or by whatever weighting methods, to therefore provide an input or control over inputs proportionate to the success rate, i.e. percentage of full throttle equals percentage actuals versus targets. The device may have cadence as a prime factor such that if the user wants to stop accelerating in the game they may stop pedaling only. If this was a shooting game, the speed of fire or movements or level of control input may be proportionate in this way, therefore to achieve full rates of fire, speed of movements, etc the user must be achieving all the targets. If this was a first person game, this system may limit the maximum movement/directional control and gaming inputs, along the analogue input from these mechanisms, as a direct proportionate success rate of exercise.

They system may provide warning systems through the integral display and speakers, or via the graphical/aural overlay device, indicative of whether the user is behind targets, on targets (within acceptable range) or too far ahead of targets, exercising too much.

Synchronisation

The integrated system will also be able to write the results and or training data from such a Game Free or Any Game session (not using the bespoke training software) to its internal memory or it may provide some form of password, to be entered. Its memory may be able to communicate with the external microprocessor to upload this data to the external microprocessor and memory means and possibly download further training programme maps. This allows this training session to be updated to the external software the next time it is connected or via the passwords.

In accordance with a further aspect, the invention provides a controller according to any preceding claim which includes a microprocessor, input means and a display which is adapted to enable user configuration of the functional relationships of the controllers input and output devices to and from the inputs and outputs available with regard to the external microprocessor-based unit.

There will now be described, by way of example only, one embodiment of the present invention with reference to the accompanying drawings of which:

Figure 1:
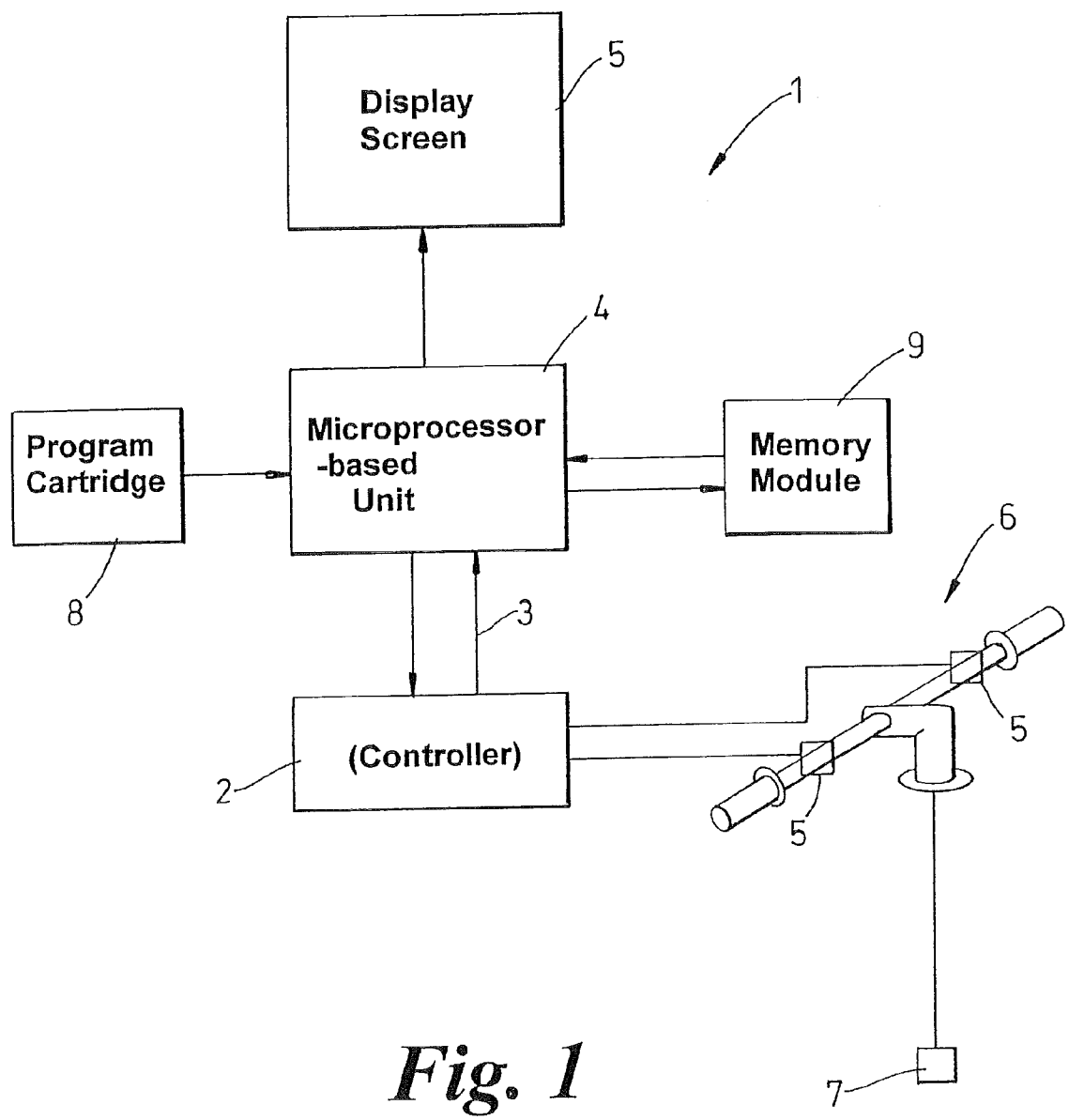
FIG. 1 is an illustration of a complete game/exercise apparatus in accordance with a first aspect of the invention.

The embodiment of the invention illustrated in FIG. 1 of the accompanying drawings comprises a complete gaming and exercise apparatus 1. It includes a controller 2 that can be used to supply signals 3 to a microprocessor based unit 4 such as a games console The controller 2 includes a number of input devices 5 that produce signals for the microprocessor based unit 4 and which form a part of or are attached to a handlebar assembly 6. It also includes a number of further input devices 7 that are operatively connected through the handlebar assembly 4 to supply signals to the controller 2, such as a cadence sensor.

FIG. 1 of the accompanying drawings also illustrates the connection of the controller into a gaming apparatus which in essence comprises:

1) a games console 4, such as the Sony Playstation, 2) a display screen 5 which receives an output signal from the console in a known manner, 3) an exercise bicycle (not shown) to which the handlebars can optionally be attached;

4) the controller comprising a set of input devices in the form of various switches, sensors and actuators of providing input signals to the console;

5) a programme cartridge 8 which contains programme instructions for the console; and 6) a memory 9 for storing settings and other data.

The controller which is attached to the stationary exercise bicycle is modified to act as a way of inputting information to the games console pertaining to the physical activity of the user. Normally, consoles 4 are used to play games by pressing one or more buttons on an input device. For example, one button may be pressed to indicate that the user wishes to "turn right" whilst another is pressed to indicate a wish to "turn left". The buttons normally provide a single on/off signal.

Indeed, all consoles are designed to receive at least one such signal in order to allow the user to interact with the game and provide instructions to the processor within the console.

Figure 2:
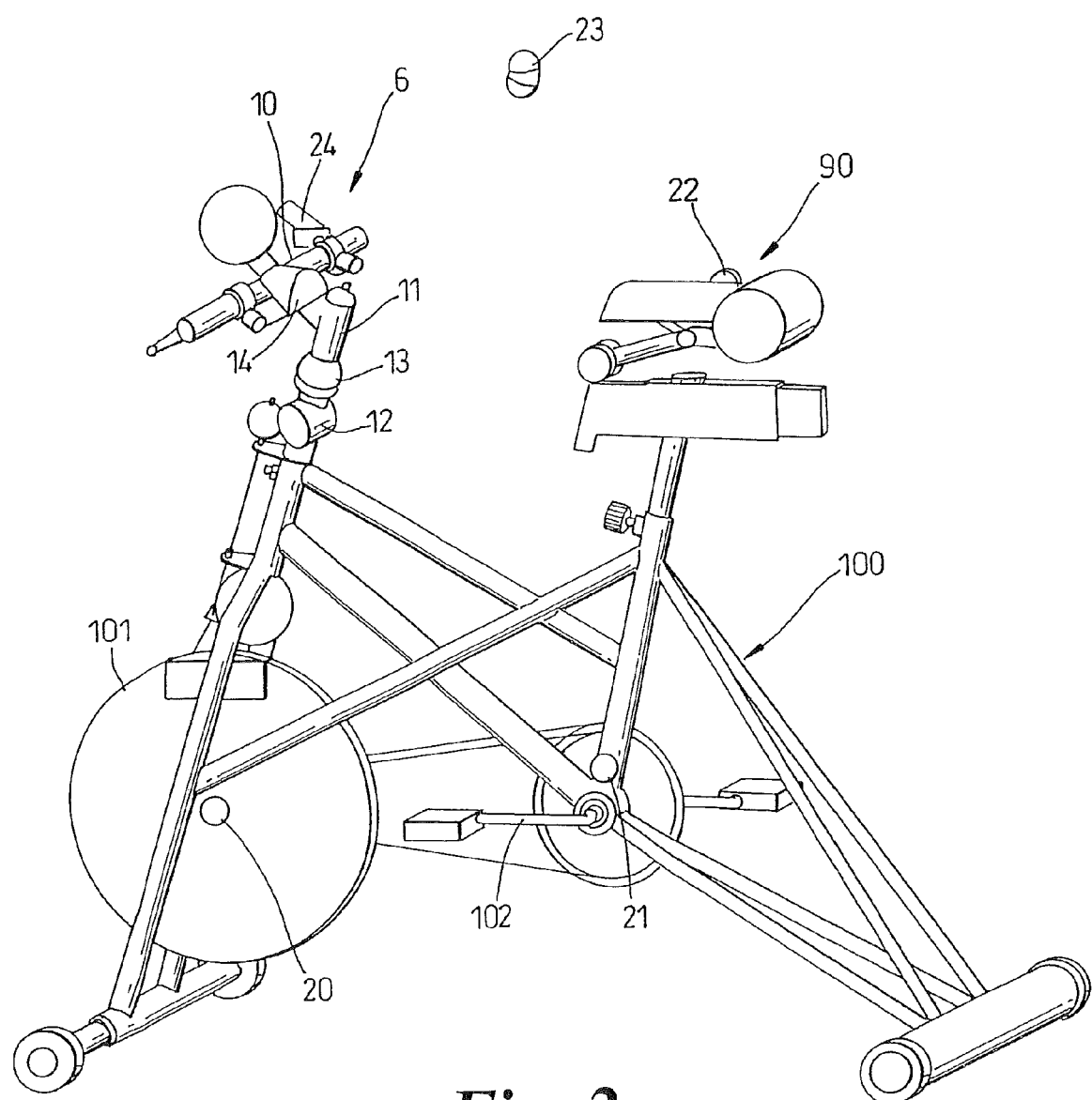
FIG. 2 is a first side view of the controller and its input devices as connected to an exercise apparatus.
Figure 3:
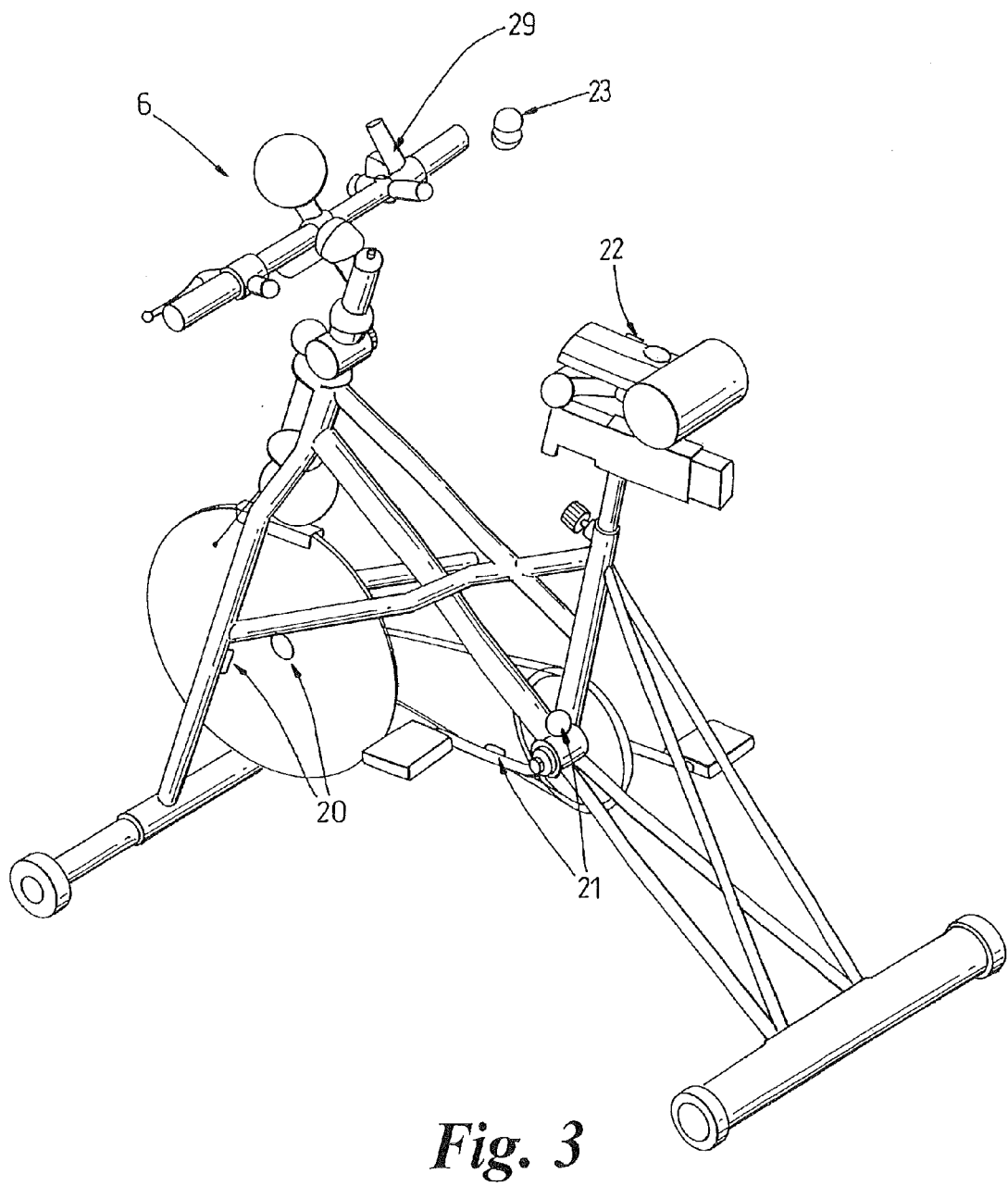
FIG. 3 is an alternative view of the apparatus of FIG. 2 illustrating in particular the location of the active input devices.

The controller of FIG. 1 does not simply comprise a hand held pad with on-off buttons as is usual in the art. It is shown in more detail as connected to an exercise bicycle in FIG. 2 of the accompanying drawings.

The controller includes a handlebar assembly 6, a saddle assembly 90 and various other input devices to attach to parts of the bicycle. The handlebar assembly 6 consists of a pair of handlebars 10 connected to a support 11 for relative movement about the support 11. This connection is through three hinges 12,13,14 permitting a full range of movement in three dimensions.

One hinge 13 allows the handlebars to be rotated relative to the support and hence the bicycle to which they are attached. Another hinge 14 permits the handlebars to be rocked from side to side (i.e. a yaw action) as if the bike was being tilted. The other hinge 12 allows the handlebars 10 to move relative to the support if the user pulls up or pushes down on the handlebars.

Three springs (not shown) provide resistance against movement about the hinges, and an adjustment device (also not shown) allows the spring tension and hence resistance to movement to be varied. The springs may bias the handlebars into a normal, rest, position when no force is exerted upon them by a user.

The handlebar assembly includes a wiring loom (not shown) which runs through the handlebars 10. One end of the loom terminates in a connector 15 for attachment of a cable to pass input signals to the console 4. The other end of each of the wires in the looms goes to one or more of the input devices which are attached to the handlebar assembly. Other wires of the loom terminate in connectors which allow other input devices that are not directly attached to the handlebars to pass signals.

The handlebar assembly also includes two brake levers 16,17.

The input devices of the controller in the illustrated embodiment are more clearly illustrated in FIGS. 3 to 10 of the accompanying drawings. They comprise a variety of switches, sensors and other units variously connected to parts of the exercise bicycle. The function of the switches is as follows:

A first input sensor 20 is connected to the bicycle 100 in such a way as to detect revolution of the wheel 101 of the bicycle. In practice, where a user's bike is connected to a trainer (often referred to as rollers or a turbo trainer) this will be the rear (driven) wheel. As shown in the illustrated embodiment, the cycle 100 is actually a dedicated stationary cycle and it is the front wheel 101 that is driven in order to make the assembly more compact.

The wheel revolution sensor 20 comprises a wheel switch that detects the passing of a magnet attached to the wheel. It produces a pulsed signal that is fed through wire(s) to the wiring loom of the handlebar assembly. The signal cam then be passed on to the microprocessor.

A second input sensor 21, similar to the wheel revolution sensor 20 comprises a reed switch that detects the passing of a pedal crank 102 of the bicycle 100 carrying a magnet. This produces a pulsed output indicative of pedal cadence. Again, this may be mounted to the exercise cycle remote from the handlebars and connect to the handlebars through wire(s) (not shown for clarity).

A third input sensor 22 comprises a pressure sensitive switch which detects whether or not a user's weight is over the saddle. This is in the form of a pressure sensitive switch that forms a part of a saddle cover that can be placed over a saddle. This input device produces a signal which is passed through wires to the handlebar assembly to signal when the user is seated or when standing over the pedals (or vice versa).

A fourth input sensor comprises a heart rate monitor 23 which produces an output indicative of the user's heart rate. As activity level is increased the heart rate increases.

Finally a fifth input sensor 24 comprises a gear selection or resistance load sensor. It provides an input signal dependent upon the position of a multi-position switch. The switch is adapted to be moved by the user as the gear is changed and/or the machine resistance is increased.

These five input devices 20,21,22,23 and 24 provide signals responsive to the movement of the user when performing the sports activity (i.e. responsive to how fast he/she pedals, the gear they select, the speed of the wheels and the user's heart rate). They are termed "active inputs".

These "active" inputs pass signals through the handlebar assembly that are used by a programme running on the microprocessor so that changes in the input signals change the behaviour of the programme. For instance, the display may show a bicycle on a road. As the pedal rate increases the programme provides signals to the display to show that the bicycle on the display speeds up.

By controlling the programme in such an active way, the programme is influenced by the level of activity of the user. This provides an incentive to the user to increase his/her activity levels or to maintain the levels within boundaries set by the display.

As well as the active inputs, the controller includes input device defining eight control inputs. These are not responsive to physical activity in terms of strength (as is pedal rate/heart rate) but instead to skills of the user when performing the exercise.

Figure 4:
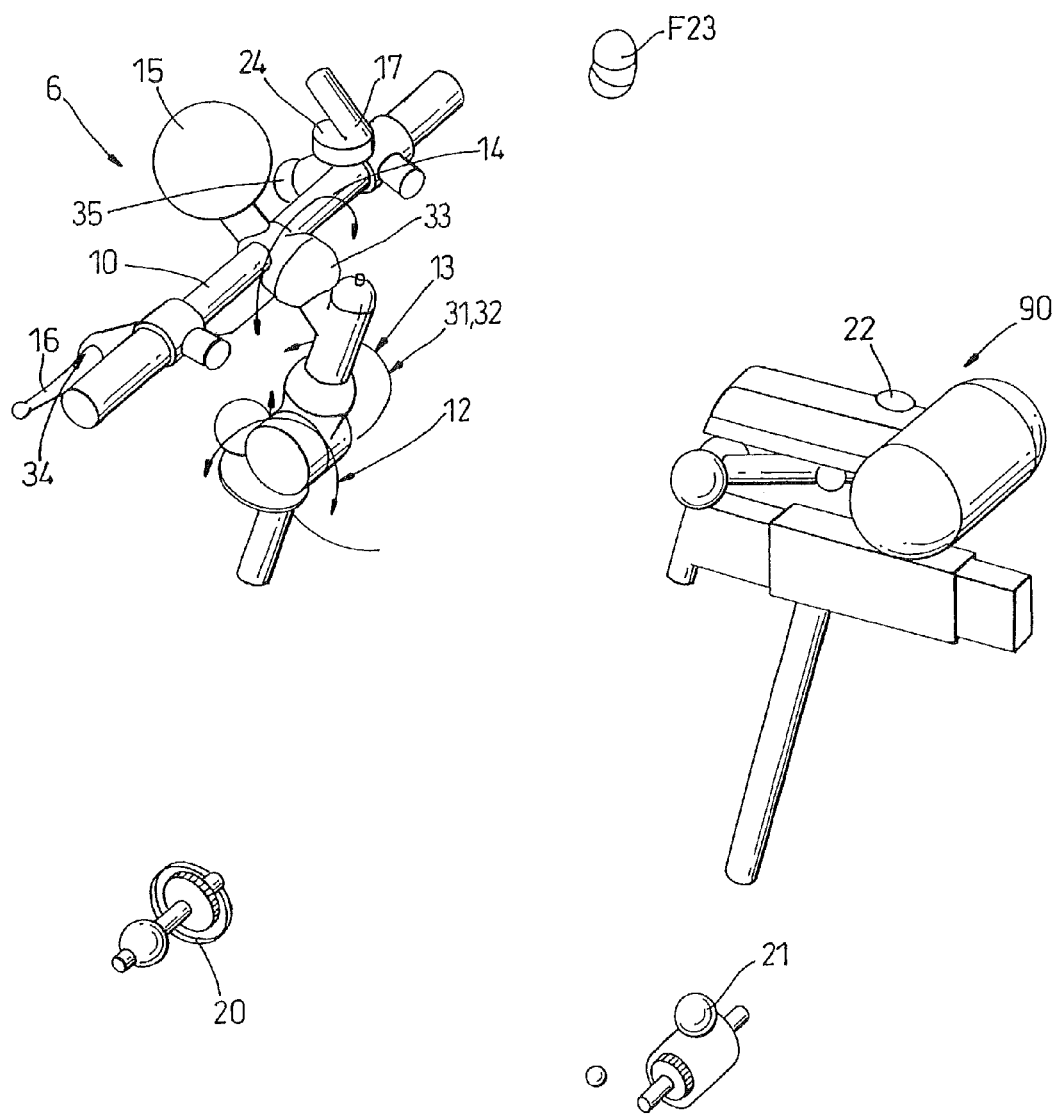
FIG. 4 is an alternative view to that of FIG. 2 illustrating the location of the control input devices.

The control inputs are best seen in FIG. 4 of the accompanying drawings.

The control inputs comprise a left turn input sensor associated and right turn input sensor, sensors detecting the shifting of the user's weight on the bicycle, and sensors detecting application of the brakes. These detect movement of the handlebars about the three degrees of movement and also movement of the brake levers.

The left/right turn sensors 31,32 detect when the user moves the handlebars to request a turn. An analogue movement detector such as a rheostat detects movement of the handlebars relative to the frame. In practice, the handlebars connect to the frame through a stem which rotates. Aligning the axis of rotation of a rheostat with the stem axis means that an analogue output is produced indicating bar position.

A sensor 33 to detect weight shift can be provided in the form of a further rheostat that detects upwards/downwards movement of the handlebars. The handlebars may therefore be supported relative to the frame by a pivoting link that pivots about a horizontal axis. A spring resistance may be provided to bias the bars into a rest position when no weight is applied. As weight is applied the bars move and the input signal varies with it.

To detect application of the brakes, a sensor 34,35 is associated with each brake lever attached to the handlebars. Each sensor produces an analogue output which varies as the displacement of the brake levers from rest increases. The output signal is adapted to increase in a stepped fashion at lest over its initial range of movement to simulate the effect of taking up slack in the system. A progressive resistance against movement of the lever is provided that simulates the feel of taking up the slack. It may also simulate the difference in feel perceived between the initial movement of the brakes and the contact of the brakes with the wheel.

The control inputs 30,31,32,33,34,35 to the microprocessor are used to control the programme in turn to alter the display. For instance, as the brakes are applied, the display may show a bicycle which slows down. If the brakes are applied too hard the bicycle shown on the screen may skid.

In this manner, the skills of the exerciser can be tested and incorporated into the operation of the programme. Again, this helps to relieve the monotony associated with use of the system.

Figure 5:
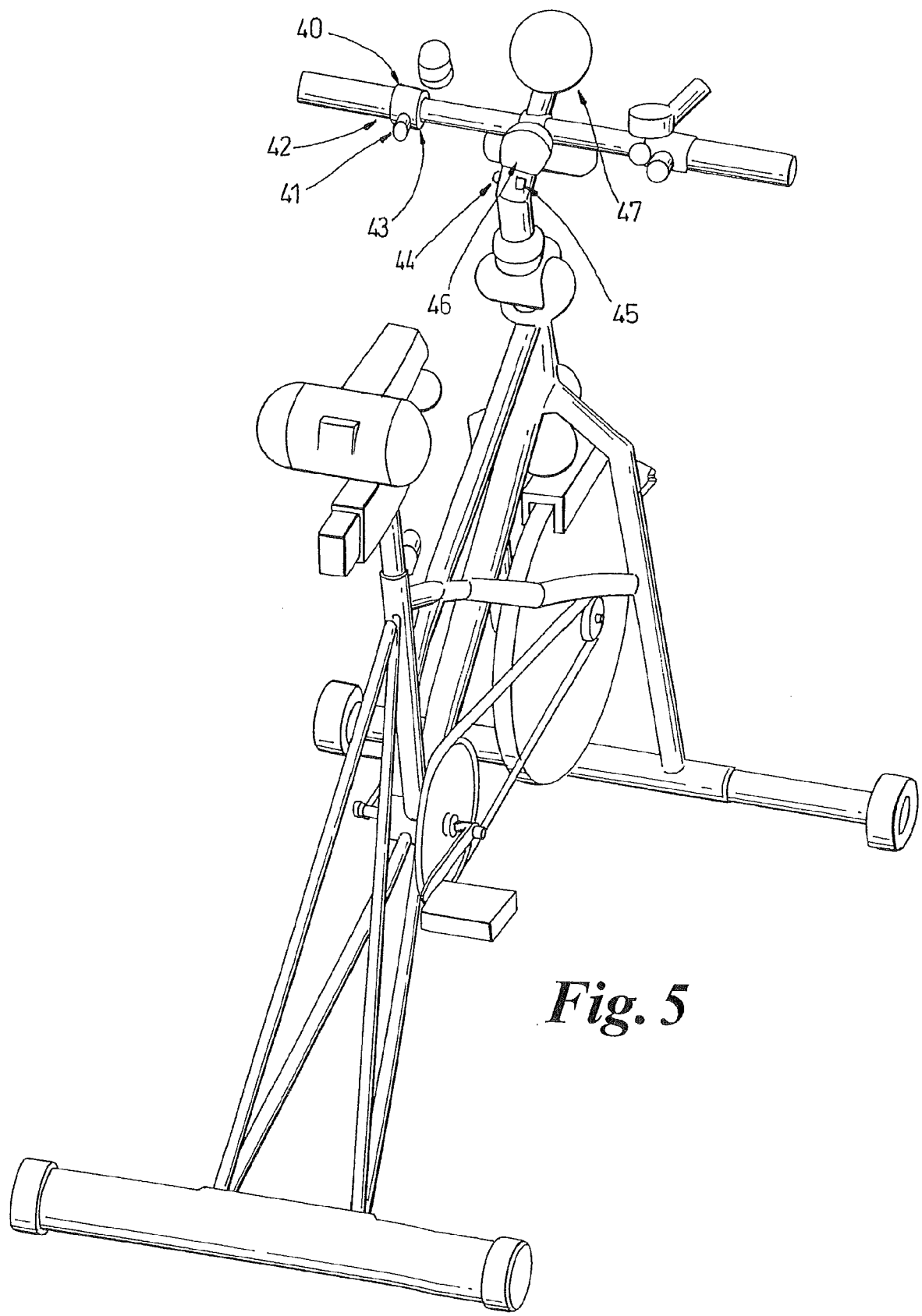
FIG. 5 is an alternative view to that of FIG. 2 illustrating the location of the system input devices on the exercise apparatus.

As well as the active and control inputs, a further set of input devices are provided which generate game inputs. These allow the user to instruct the programme to show a cycle performing various tricks, such as jumps and wheelies. These may comprise switches 41-47 that are located within easy reach of the user, for example on the handlebars as shown. They are best seen in FIG. 5 of the accompanying drawings. The function allocated to each switch may be varied under software control.

Figure 6:
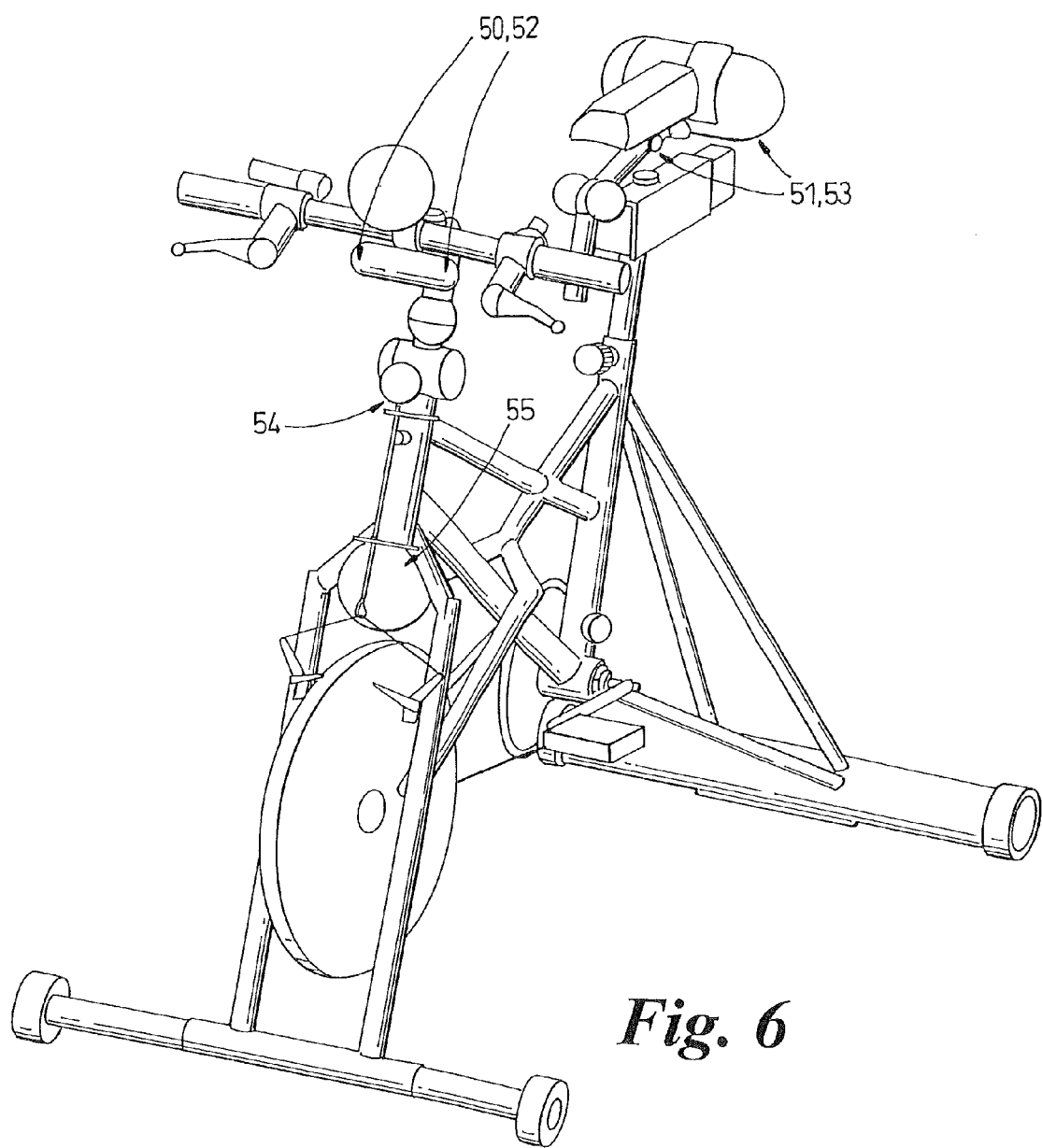
FIG. 6 is a still further alternative view to that of FIG. 2 illustrating the location of the output (simulation) devices.

Finally, the system includes a number of output devices as shown best in FIG. 6 of the accompanying drawings. These devices comprise actuators which receive signals output from the programmable unit and which move the exercise device to simulate movement over rough terrain or driving during heavy braking.

A front shock actuator 50 is provided which controls the height of the handlebars, and a rear shock actuator 51 is provided which controls the height of the saddle. The programme instructs the actuators to move the handlebars or saddle as appropriate depending upon what is shown on the display.

For example, if the programme is displaying a cycle passing over an obstacle, the actuators may be energised to move the bars and/or saddle to simulate crossing the obstacle.

Each actuator is fed from a signal reader and a converter which connects the signal into instructions that are fed to the actuator. Typically, the programmable unit supplies pulsed coded signals that are interpreted by the converter to drive the actuator(s).

A further pair of actuators 52,53 may be adapted to vibrate the bars and/or saddle to simulate brake judder.

Also, the exercise cycle includes means 54 for increasing the pedal resistance. In the embodiment shown, the pedals drive a flywheel through a chain. Pads or friction material grab opposing sides of the flywheel to provide resistance. The force with which they grab the flywheel can be increased to make resistance to pedaling higher or decreased to make the resistance lower by moving an actuator. This actuator is controlled by pulsed signals from the programmable unit. This allows the resistance to be increased if the display shows the bicycle to be going uphill.

An output device 55 in the form of a flywheel is also provided to give feel to the handlebar movement that simulates the effect of inertia on a bicycle.

Finally, as shown, further (optional) controls are provided to produce any additional instructions to the programmable unit (i.e. start programme/pause programme/stop programme).

The input devices connect to the console 4 in place of a standard control pad. Each switch or sensor replaces a switch/paddle/button or joystick on a standard input game pad or controller. Thus, no modification of an existing console is needed other than the provision of appropriate programmes.

It is envisaged that two types of programme are provided. In a first type, the active inputs control movement of images on the display such as the speed of a bicycle along a simulated road or track. The direction of the bicycle may be controlled by applying force to the handlebars. This allows racing both against other simulated riders and/or against the clock to be simulated. One or more units may be linked together, for instance using the internet, to allow riders to compete against each other.

In another, a structured training programme may be provided. The programme sets targets for the rider to achieve, such as completing a simulated race or course in a given time limit, or at a given resistance setting. The structure of the training programme may be such as to increase the level of fitness needed to complete subsequent stages and only allow the user to attempt the subsequent stages once earlier stages have been satisfactorily completed.

The handlebar controller 2 may be used to provide an interface between a user and a game simulation for a cycling game, although it may also be used to control other games such as motorcycle simulations or perhaps even hangliding. It may be used on its own without an exercise apparatus as a pure controller and it is envisaged that this may be useful in a wide range of applications other than gaming as a control device.

It is envisaged that as well as providing control for leisure games run on a microprocessor the controller may be used to great effect as an input device for controlling a program adapted to assist in a rehabilitation program. For instance, the program may ask the user to perform a range of exercise tasks which it can then monitor through the signals output by the controller. A progressive training program can then be implemented with feedback available about the users improvements over time. Such a scheme, may, it is envisaged, be especially useful for users who are trying to recover fitness or movement after an illness or accident.

The invention claimed is:

1. Apparatus comprising a combination of a controller and a microprocessor based unit, the apparatus comprising;
   a programmable microprocessor-based unit including a receiving means adapted to receive signals from a programmable cartridge or other programme storage device that provides programme instructions for controlling the operation of the programmable microprocessor-based unit;
   a display arranged to display images dependent upon output signals from the microprocessor-based unit;
   an output through which the output signals can be passed from the microprocessor-based unit to the display;
   an exercise bicycle adapted to allow a user to perform a range of movements associated with a sport; and
   a controller comprising a handlebar assembly which can be held by a user of the exercise bicycle, a first input device responsive to movement of the handlebar assembly which generates input signals for supply to the microprocessor-based unit, a saddle which can be sat upon by the user of the exercise bicycle, and a second input device which is responsive to the force applied to the saddle by said user so as to indicate whether or not the user is seated on said saddle while in use of the bicycle, said second input device also generates input signals for supply to the microprocessor-based unit, and in which the first input signal and the second input signal modify the operation of the programme running on the microprocessor-based unit in turn to modify the images displayed on the display, while the user is riding the exercise bicycle.

2. A combination according to claim 1 wherein said handlebar assembly comprises a handlebar rotatably attached to a handlebar support, such that said handlebar may rotate relative to said support about three perpendicular axes, and further wherein said handlebar can be translated relative to said support in at least one direction.

3. A combination according to claim 2 wherein said handlebar can translate relative to said support in two orthogonal directions.

4. A combination according to claim 3 wherein said handlebar can translate relative to said support in three orthogonal directions.

5. A combination according to claim 1 which further includes at least one actuator which causes movement of said handlebar assembly in response to signals from at least one of said input devices and from said microprocessor-based unit.

6. A combination according to claim 1 wherein said seat comprises a cover which includes said at least one additional input device and which fits onto an existing seat.

7. A combination according to claim 1 wherein said seat is supported by a first portion of a support which is adapted to rotate relative to a second portion of said support, and in which a seat input device is provided which is responsive to rotation of the first portion of the support relative to said second portion.

8. A combination according to claim 1 wherein said seat is supported by a first portion of a support which is at least one of compressible and extendible relative to a second portion of said support, and in which a seat input device is provided which is responsive to movement of said first portion of said support relative to said second portion.

9. A combination according to claim 8 wherein said second portion comprises a tube which fits within a seatpost of at least one of a bicycle and an exercise bicycle.

10. A combination according to claim 1 which further includes at least one actuator which is adapted to cause movement of said seat in response to signals from at least one of said input devices and from the microprocessor-based unit.

11. A combination according to claim 1 which further includes at least one actuator which is adapted to cause movement of said handlebar assembly or an external supporting means in response to signals from at least one of said input devices and from said microprocessor-based unit.

12. A combination according to claim 1 which further includes a variable speed electric fan which is adapted to change speed in response to signals from at least one of said input devices and from said microprocessor-based unit.

13. A combination according to claim 1 wherein at least one foot operated input device is provided, said at least one foot operated input device comprising at least one pressure sensitive device.

14. A combination according to claim 1 wherein at least one hand operated input device is provided, said at least one hand operated device comprising at least one pressure sensitive device to sense said user's hands on handlebar grips of said handlebar assembly.

15. A combination according to claim 1 in which one of said input devices is attached to or forms an integral part of said handlebar assembly.

16. A combination according to claim 1 in which said handlebar assembly comprises a set of handlebars attached to a handlebar support so that said handlebars can move relative to said handlebar support.

17. A combination according to claim 16 wherein at least one of said input devices produces an output signal responsive to relative movement between said handlebar and said handlebar support.

18. A combination according to claim 16 wherein said handlebar assembly may move with at least one degree of freedom and includes at least one of a resistance and a damping means which provide at least one of a resistance and a damping to movement of said handlebars relative to said handlebar support about any of said at least one degrees of freedom.

19. A combination according to claim 18 wherein at least one of said resistance and said damping is adjustable by said user.

20. A combination according to claim 18 wherein at least one of said resistance and said damping means is adjusted automatically in response to signals generated by said input devices or by said microprocessor unit.

* * * * *